United States Patent
Kimura

(10) Patent No.: US 10,102,166 B2
(45) Date of Patent: *Oct. 16, 2018

(54) MULTIPROCESSOR SYSTEM

(71) Applicant: RENESAS ELECTRONICS CORPORATION, Tokyo (JP)

(72) Inventor: Kenji Kimura, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/811,414

(22) Filed: Nov. 13, 2017

(65) Prior Publication Data
US 2018/0067882 A1  Mar. 8, 2018

Related U.S. Application Data

(63) Continuation of application No. 14/622,299, filed on Feb. 13, 2015, now Pat. No. 9,846,666.

(30) Foreign Application Priority Data

Feb. 18, 2014 (JP) ................................ 2014-028319

(51) Int. Cl.
*H03M 13/43* (2006.01)
*G06F 13/364* (2006.01)
(Continued)

(52) U.S. Cl.
CPC ........ *G06F 13/364* (2013.01); *G06F 11/0757* (2013.01); *G06F 11/0766* (2013.01);
(Continued)

(58) Field of Classification Search
CPC .............................. H03M 13/43; G06F 13/43
(Continued)

(56) References Cited

U.S. PATENT DOCUMENTS

| 4,096,571 A | 6/1978 | Vander Mey |
| 2007/0033511 A1 | 2/2007 | Davies |

(Continued)

FOREIGN PATENT DOCUMENTS

| JP | 08-221369 A | 8/1996 |
| JP | 08-278898 A | 10/1996 |
| JP | 2011-248809 A | 12/2011 |
| JP | 2013-206265 A | 10/2013 |
| JP | 2013-242746 A | 12/2013 |

OTHER PUBLICATIONS

Office Action issued in Japanese Patent Application No. 2014-028319, dated Aug. 29, 2017.
(Continued)

*Primary Examiner* — Christopher Shin
(74) *Attorney, Agent, or Firm* — McDermott, Will & Emery LLP

(57) ABSTRACT

The present invention realizes a functional safety of a multiprocessor system without tightly coupling processor elements. When causing a plurality of processor elements to execute the same data processing and realizing a functional safety of the processor element, there is adopted a bus interface unit that performs control of performing safety measure processing when the non-coincidence of access requests issued from the processor elements has been fixed, and of starting access processing responding the access request when these access requests coincide with one another.

7 Claims, 17 Drawing Sheets

(51) Int. Cl.
*G06F 11/14* (2006.01)
*G06F 11/18* (2006.01)
*G06F 11/16* (2006.01)
*G06F 13/36* (2006.01)
*G06F 11/07* (2006.01)

(52) U.S. Cl.
CPC .......... *G06F 11/14* (2013.01); *G06F 11/1683* (2013.01); *G06F 11/184* (2013.01); *G06F 11/0796* (2013.01); *G06F 11/1641* (2013.01); *G06F 11/181* (2013.01); *G06F 2201/845* (2013.01)

(58) Field of Classification Search
USPC .......................................... 714/797; 710/110
See application file for complete search history.

(56) References Cited

U.S. PATENT DOCUMENTS

| | | |
|---|---|---|
| 2008/0005435 A1 | 1/2008 | Jung et al. |
| 2009/0063724 A1 | 3/2009 | Pechanek et al. |
| 2015/0039944 A1* | 2/2015 | Vilela .................... G06F 11/16 714/43 |

OTHER PUBLICATIONS

Non-Final Office Action issued in related parent U.S. Appl. No. 14/622,299, dated Mar. 23, 2017.
Notice of Allowance issued in related parent U.S. Appl. No. 14/622,299, dated Aug. 11, 2017.
Chinese Office Action issued in corresponding Chinese Patent Application No. 20150085235X, dated Aug. 2, 2018, with English Translation.

* cited by examiner

MULTIPROCESSOR SYSTEM

CROSS-REFERENCE TO RELATED APPLICATION

This application is a continuation of U.S. patent application Ser. No. 14/622,299, filed on Feb. 13, 2015, which claims the benefit of Japanese Patent Application No. 2014-028319 filed on Feb. 18, 2014 including the specification, drawings and abstract are incorporated herein by reference in their entirety.

BACKGROUND

The present invention relates to a multiprocessor system having a plurality of processor elements, and relates, for example, to a technology that is effective when being applied to an ECU (electronic control unit) for vehicle, a microcomputer for an ECU, or the like for which functional safety is necessary and operation continuity is to be considered.

Along with electrification of cars in recent years, requests for functional safety and operation continuity have been intensified. That is, there are intensified requests for functional safety (fail-safe) such as performing communication before the generation of abnormality in a controller to thereby prevent accidents beforehand, or continuing an operation even when abnormality occurs to thereby allow the movement of the car to a repair shop possible. As technologies corresponding to fail-safe, conventionally DLS (Dual Lock Step) and TMR (ternary majority rule) are provided. In DLS, for example, two processor elements that perform the same data processing are tightly coupled and operated, the operation results are compared one by one, the data processing is continued on the condition that the comparison results are the same, the determination of abnormality is made when the comparison results do not coincide with each other, and thus a changeover or the like to an alternative device is performed. As an example of a literature in which DLS is described, there is Japanese Patent Laid-Open No. 2013-242746.

TMR is a technology of tightly coupling three processor elements, making a comparison one by one among the output from respective processor elements one by one, and applying the majority rule to non-coincidence, to thereby be made relievable even when one processor is in an abnormal state. As an example of a literature in which TMR is described, there is Japanese Patent Laid-Open No 1996-278898.

SUMMARY

The present inventor has examined the functional safety of a microcomputer for automobile use, or the like. According to the examination, in conventional cases where TMR or DLS is realized by tightly coupling a plurality of processor elements, the mode of fail-safe is fixed. Accordingly, it is difficult to realize a programmable fail-safe function such as realizing a fail-safe function only between required processor elements in accordance with processing or performing fail-safe only for required data processing. Furthermore, when one processor element has broken down, also it is not also possible to reconstruct a group of processor elements that perform TMR or DLS by using another processor element. If trying to implement all the dedicated hardware for TMR or DLS beforehand, the circuit scale increases and becomes too redundant to thereby cause cost increase.

Moreover, a restriction in which, when trying to satisfy both the realization of high performance and the realization of functional safety in the implementation of a plurality of processor elements, processor elements have to be given relationship to each other and have to be tightly coupled makes it difficult to cause the processor elements to operate at the highest speed. In the conventional functional safety technique by connecting processor elements, speed restriction for processor elements becomes large.

The other problems and the new feature of the present invention will become clear from the description of the present specification and the accompanying drawings.

The following explains briefly the outline of a typical embodiment among the embodiments disclosed in the present application.

That is, when causing a plurality of processor elements to execute the same data processing and realizing a functional safety of the processor element, there is adopted a bus interface unit that performs control of performing safety measure processing when the non-coincidence of access requests issued from the processor elements has been fixed, and of starting access processing responding the access request when these access requests coincide with one another.

The following explains briefly the effect acquired by the typical embodiment among the embodiments disclosed in the present application.

That is, the functional safety of a multiprocessor system can be realized without tightly coupling processor elements.

DETAILED DESCRIPTION

1. Outline of Embodiment

Figure 1:
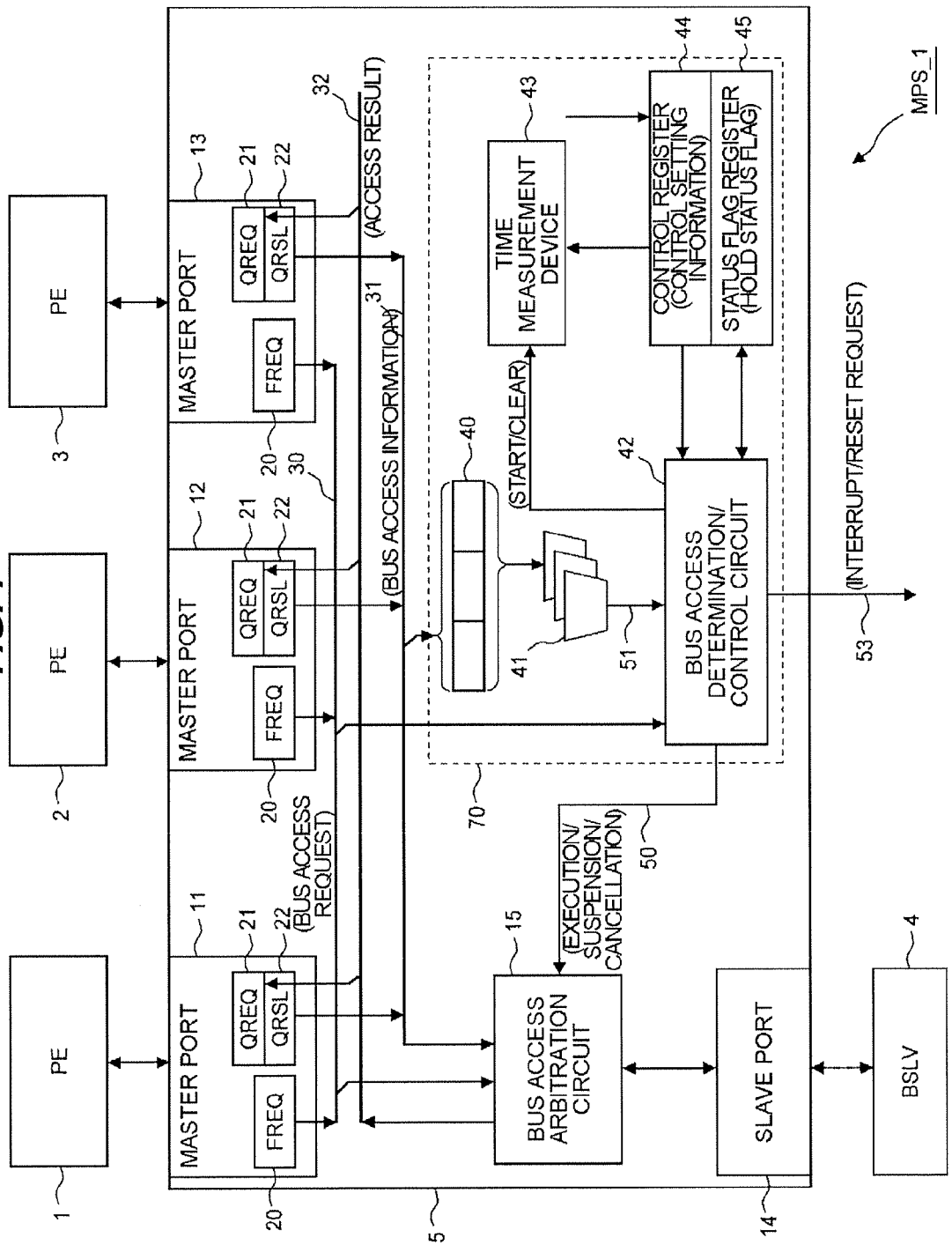
FIG. 1 is a block diagram showing a first example of a multiprocessor system.

First, the outline of the embodiment disclosed in the present application will be explained. A reference sign in a drawing that is referred to with parentheses in the outline explanation about the embodiment only exemplifies one that is included in the concept of a constituent component to which the sign is attached.

[1] <Fail-Safe Function of Processor Element Using Bus Interface Unit>

Multiprocessor systems (MPS_1, MPS_2, and MPS_3) include a plurality of processor elements (1, 2, and 3), a bus slave module (4) that is made accessible by the processor element, and bus interface units (5, 5A, and 5B) that are disposed between the processor element and the bus slave module. The bus interface unit has a bus access arbitration circuit (15A) that arbitrates a competition for bus access requests from the processor elements, and fail-safe circuit blocks (70 and 70A) for realizing the functional safety of the processor elements. The fail-safe circuit block performs safety measure processing based on fixing of non-coincidence of access requests issued from a plurality of processor elements after the prescribed processor elements performs the same data processing in parallel, and performs control of starting access processing responding to the access requests based on coincidence thereof.

Therefore, the functional safety of a multiprocessor system can be realized without tightly coupling processor elements. From the viewpoint of functional safety of the system, no measure based on hardware is required on a processor element side and it also becomes possible to set arbitrarily the presence/absence of checking by a fail-safe function per relevant processor element unit and the combination of processor elements to be checked. Furthermore, the operation speed of the processor element is not restricted by fail-safe function. As described above, the degree of freedom of selection of fail-safe function increases, and cost for implementing a fail-safe function on a multiprocessor system can be decreased.

[2] <Fail-Safe Control in Operation Corresponding to DLS>

In item 1, in the case where, when a first access request is issued from one of the processor elements, a second access request that coincides with the same can be determined through parallel execution of the same data processing by the prescribed two processor elements, the fail-safe circuit block executes a common access responding to the first access request and the second access request (B-7 and C-38). In the case where, when the first access request is issued from one of the processor elements, the second access request that coincides with the same cannot be determined through parallel execution of the same data processing by the prescribed two processor elements, the fail-safe circuit block suspends execution of the first access request (D-9 and B-38), and in a case where the second access request can be determined until passage of a predetermined time, releases the suspension of the first access request and executes a common access responding to the first access request and the second access request (B-7 and C-38), and in the case where the second access request cannot be determined until passage of a predetermined time, performs the safety measure processing relating to the first access request (D-10 and B-39). Refer to FIGS. 2 to 4, and FIGS. 9 to 10.

According to the above, a fail-safe control in an operation corresponding to DLS can be realized.

[3] <Cancellation of Access Request>

In item 2, the safety measure processing relating to the first access request is a cancellation of the first access request.

According to the above, it is possible to perform an action while assuming the case where the extension of abnormality can be suppressed when only abnormal bus access is made invalid.

[4] <Instruction of Operation Stop to Processor Element>

In item 2, the safety measure processing relating to the first access request is an instruction of operation stop for a processor element that is an issue source of the first access request.

According to this, it is possible to perform an action while assuming the case where the operation continuation of the issue source of the abnormal bus access request has to be prevented.

[5] <Instruction of Reset Processing to Processor Element>

In item 2, the safety measure processing relating to the first access request is an instruction of reset processing to the processor element that is the issue source of the first access request.

According to this, it is possible to perform an action while assuming the case where the issue source of the abnormal bus access request has to be reset and the operation has to be continued.

[6] <Error Notification to Outside of Multiprocessor System>

In any of item 3 to item 5, the safety measure processing relating to the first access request further includes an error notification to the outside of the multiprocessor system.

According to this, it is possible to perform an action while assuming the case where the abnormality of a processor element extends to the outside of the multiprocessor system.

[7] <First Form of Fail-Safe Control in Operation Corresponding to TMR>

Figure 5:
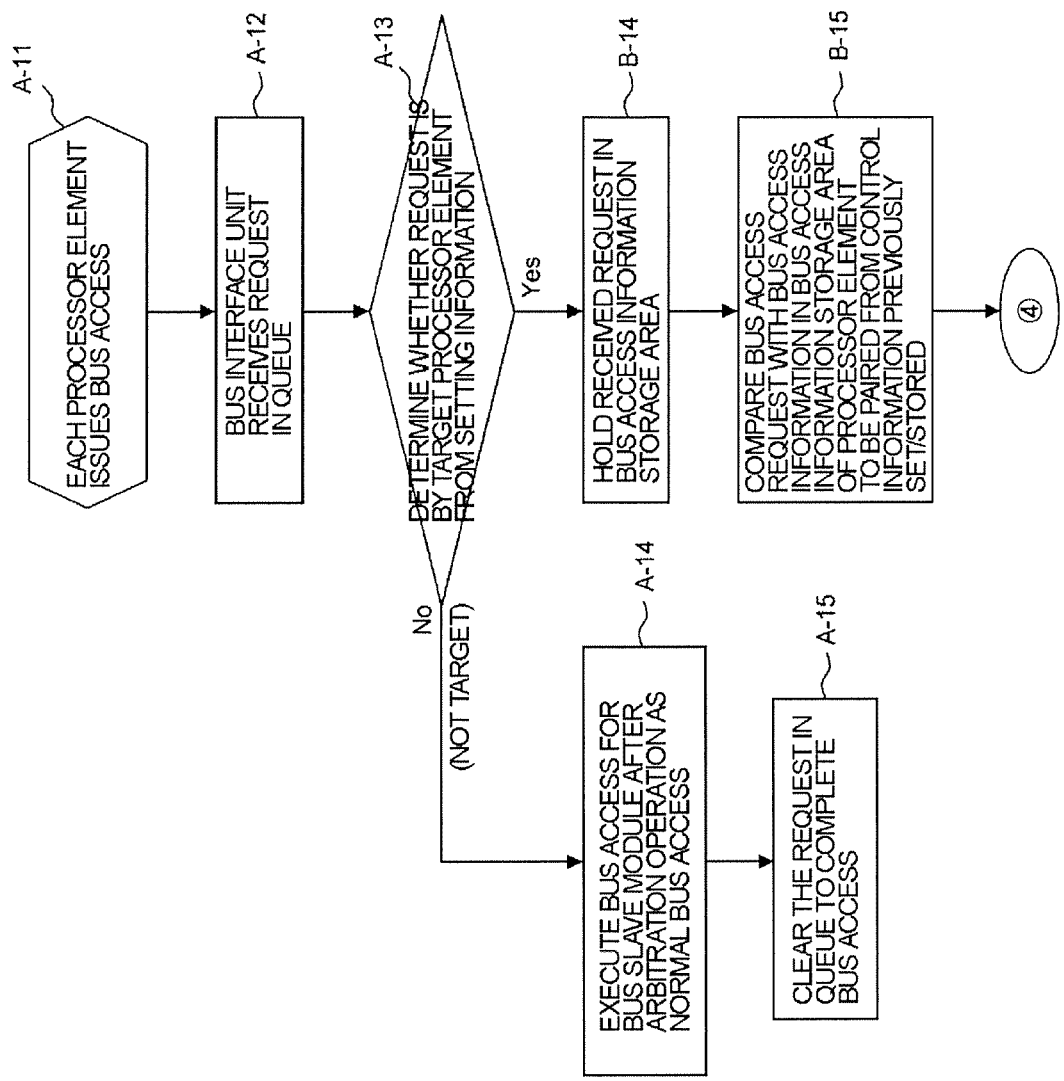
FIG. 5 is an operation flow chart when an operation corresponding to TMR is performed while specifying three processor elements.
Figure 6:
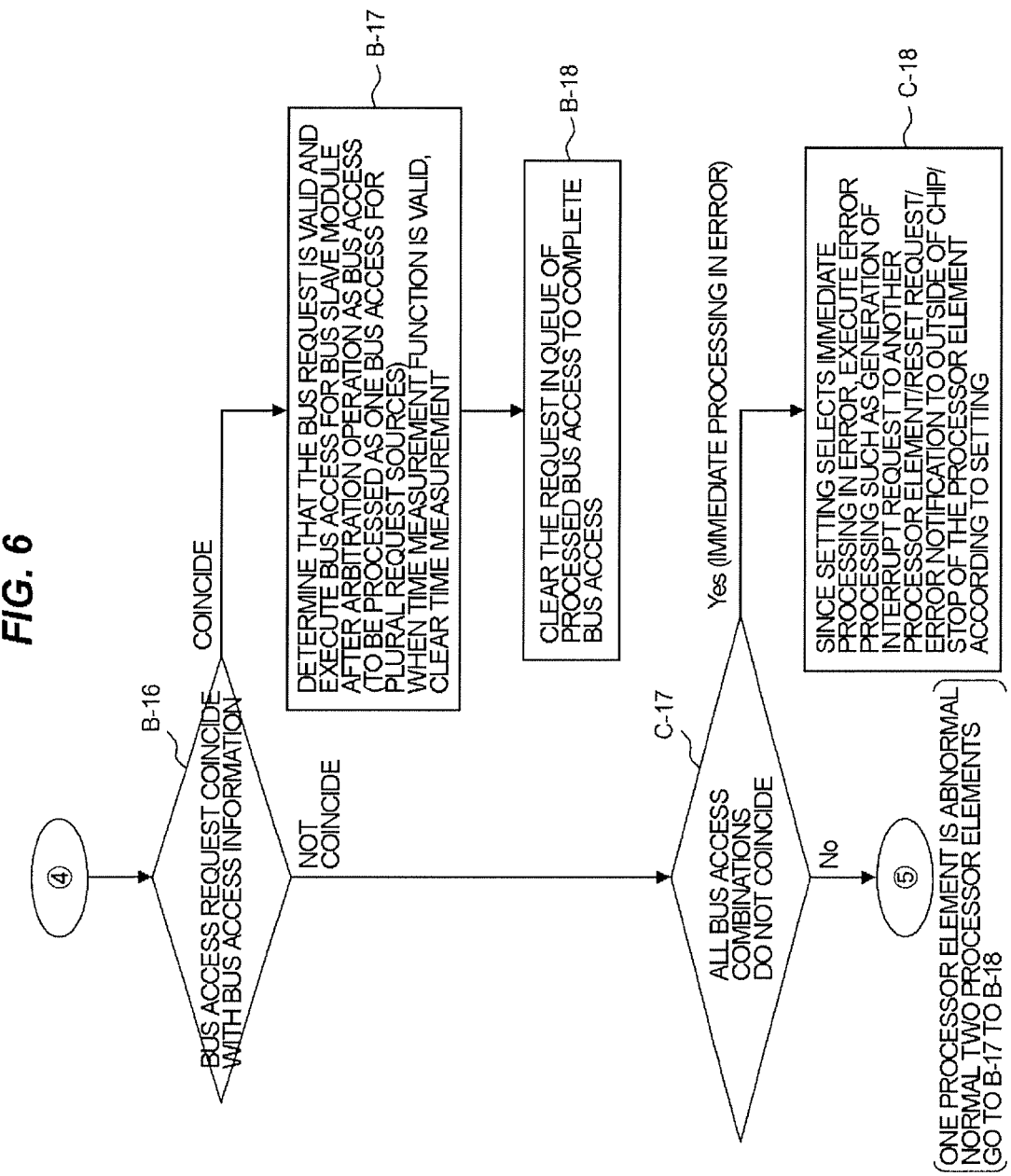
FIG. 6 is an operation flow chart following FIG. 5.
Figure 7:
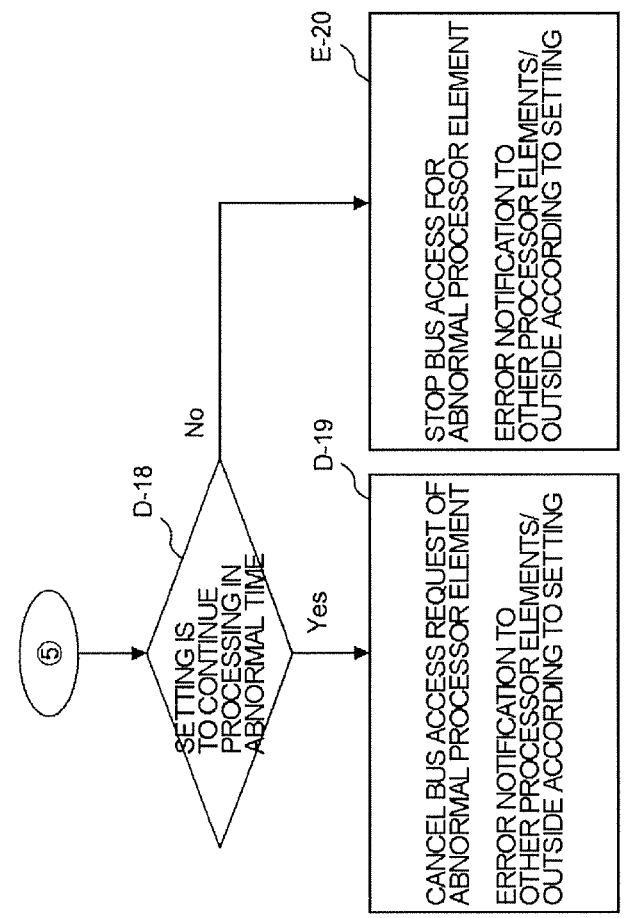
FIG. 7 is an operation flow chart following FIG. 6.

In item 1, in the case where, when a first access request is issued from one of the processor elements, a second access request and a third access request which coincide with the same can be determined through parallel execution of the same data processing by the prescribed three processor elements, the fail-safe circuit block executes a common access responding to the first access request, the second access request and the third access request (B-17). In the case where, when the first access request is issued from one of the processor elements, the second access request and the third access request which coincide with the same cannot be determined through parallel execution of the same data processing by the prescribed three processor elements, the fail-safe circuit block suspends execution of the first access request (B-16), and in the case where both the second access request and the third access request can be determined until passage of a predetermined time, the fail-safe circuit block releases the suspension of the first access request and executes a common access responding to the access request relating to coincidence (B-17). In the case where either one of the second access request and the third access request can be determined until passage of the predetermined time, the fail-safe circuit block releases the suspension of the first access request and executes a common access responding to an access request relating to a coincidence (B-17) and performs the safety measure processing relating to the other access request of the second access request or the third access request that cannot be determined (D-19 and E-20). In the case where both the second access request and the third access request cannot be determined until passage of the predetermined time, the fail-safe circuit block performs the safety measure processing relating to the first access request, the second access request and the third access request (C-18). Refer to FIGS. 5 to 7.

According to this, a fail-safe control in an operation corresponding to TMR can be realized.

[8] <Cancellation of Access Request>

In item 7, the safety measure processing relating to the access request is the cancellation of the corresponding access request.

According to the above, it is possible to perform an action while assuming the case where the extension of abnormality can be suppressed when only the abnormal bus access is made invalid.

[9] <Instruction of Operation Stop to Processor Element>

In item 7, the safety measure processing relating to the access request is an instruction of operation stop to a processor element that is the issue source of the corresponding access request.

According to the above, it is possible to perform an action while assuming the case where the operation continuation of the issue source of the abnormal bus access request has to be prevented.

[10] <Instruction of Reset Processing to Processor Element>

In item 7, the safety measure processing relating to the access request is an instruction of reset processing to the processor element that is the issue source of the corresponding access request.

According to the above, it is possible to perform an action while assuming the case where the issue source of the abnormal bus access request has to be reset and the operation must be continued.

[11] <Error Notification to Outside of Multiprocessor System>

In any of item 8 to item 10, the safety measure processing relating to the access request further includes an error notification to the outside of the multiprocessor system.

According to the above, it is possible to perform an action while assuming the case where the abnormality of a processor element extends to the outside of the multiprocessor system.

[12] <Second Form of Fail-Safe Control in Operation Corresponding to TMR>

In item 1, in the case where, when a first access request is issued from one of the processor elements, a second access request and a third access request which coincide with the same can be determined through parallel execution of the same data processing by the prescribed three processor elements, the fail-safe circuit block executes a common access responding to the first access request, the second access request and the third access request (C-38). In the case where, when the first access request is issued from one of the processor elements, the second access request and the third access request which coincide with the same cannot be determined through parallel execution of the same data processing by the prescribed three processor elements, the fail-safe circuit block suspends execution of the first access request (B-38), and in a case where the second access request and the third access request can be determined until passage of a first time (B-37), the fail-safe circuit block releases the suspension of the first access request and executes a common access responding to the access request relating to coincidence (C-38). In the case where either one of a second access request and a third access request can be determined until passage of the first time, the fail-safe circuit block releases the suspension of the first access request and executes a common access responding to an access request relating to a coincidence and holds an access result in a buffer (D-39 and D-41), and furthermore in the case where the other of the second access request or the third access request can be determined until passage of a second time (D-43), the fail-safe circuit block performs a control of returning the access result held in the buffer to respective access request sources as a result of responding to an access result relating to coincidence (F-44), and in the case where the other of the second access request or the third access request cannot be determined until passage of the second time, the fail-safe circuit block performs a control of returning the access result held in the buffer to respective access request sources as a result of responding to an access result relating to coincidence (D-48) and performs the safety measure processing relating to an access request relating to non-coincidence (D-46 and D-47). In the case where both a second access request and a third access request cannot be determined until passage of the first time, the fail-safe circuit block performs the safety measure processing relating to the first access request, the second access request and the third access request (B-39). Refer to FIGS. 9 to 13.

According to the above, a fail-safe control in the operation corresponding to TMR can be realized. In particular, it is possible to fix the processing while performing preceding access processing at the time when access requests from two processor elements among three coincide with each other and corresponding to coincidence/non-coincidence of one remaining access request.

[13] <Cancellation of Access Request>

In item 12, the safety measure processing relating to the access request is a cancellation of the corresponding access request.

According to the above, it is possible to perform an action while assuming the case where the extension of abnormality can be suppressed when only the abnormal bus access is made invalid.

[14] <Instruction of Operation Stop to Processor Element>

In item 12, the safety measure processing relating to the access request is an instruction of operation stop to a processor element that is the issue source of the corresponding access request.

According to the above, it is possible to perform an action while assuming the case where the operation continuation of the issue source of the abnormal bus access request has to be prevented.

[15] <Instruction of Reset Processing to Processor Element>

In item 12, the safety measure processing relating to the access request is an instruction of reset processing to the processor element that is the issue source of the corresponding access request.

According to the above, it is possible to perform an action while assuming the case where the issue source of the abnormal bus access request must be reset and the operation must be continued.

[16] <Error Notification to Outside of Multiprocessor System>

In any of item 13 to item 15, the safety measure processing relating to the access request further includes an error notification to the outside of the multiprocessor system.

According to the above, it is possible to perform an action while assuming the case where the abnormality of a processor element extends to the outside of the multiprocessor system.

[17] <Fail-Safe Function Using Bus Interface Unit for Processor Element Specified so as to be Variable>

Multiprocessor systems (MPS_1, MPS_2, and MPS_3) have a plurality of processor elements (1-3), a bus slave module (4) that is accessible by the processor element, and a bus interface units (5 and 5A) that are disposed between the processor element and the bus slave module. The bus interface unit has a bus access arbitration circuit (15) that arbitrates a competition for bus access requests from the processor elements, and fail-safe circuit blocks (70 and 70A) for realizing the functional safety of the processor elements. The fail-safe circuit block sets a plurality of processor elements that are specified to be programmable among the plurality of processor elements as a target for realizing the functional safety. The fail-safe circuit block performs safety measure processing based on fixing of non-coincidence of access requests issued from a plurality of processor elements after the prescribed processor elements specified to be programmable performs in parallel the same data processing, and performs control of starting access processing responding to the access requests based on coincidence thereof.

According to the above, the functional safety of a multi-processor system can be realized without tightly coupling processor elements. In view of functional safety of a system, no measure based on hardware is necessary in a processor element side and it also becomes possible to set arbitrarily the presence or absence of checking by a fail-safe function per relevant processor element unit and the combination of processor elements to be a check target. Furthermore, the operation speed of the processor element is not restricted by fail-safe function. Since a processor element to be the target of fail-safe can be specified so as to be programmable, the degree of freedom of selection of fail-safe function such as the form of fail-safe such as TMR or DLS, dynamic enforcement of a fail-safe function for specified data processing and reconfiguration after abnormality generation of a plurality of processor elements to be a fail-safe target increases remarkably depending on specification approach. According to the above, implementation cost of a fail-safe function for a multiprocessor system can be decreased.

[18] <Control Register for Specifying Processor Element so as to be Programmable>

In item 17, a multiprocessor system includes a control register (44) for specifying a processor element set to be a target for realizing the functional safety so as to be programmable.

According to the above, it becomes possible to specify easily a processor element to be a target for realizing functional safety by a specified processor element or from the outside of the multiprocessor system.

[19] <Operation Corresponding to DLS for Specified Two Processor Elements>

In item 18, the fail-safe circuit block, when two processor elements are specified by the control register, performs an operation corresponding to dual lock-step as processing realizing a functional safety for the two processor elements that perform in parallel the same data processing.

According to the above, it is possible to realize easily the operation corresponding to DLS for two processor elements specified so as to be programmable.

[20] <Operation Corresponding to TMR for Specified Three Processor Elements>

In item 18, the fail-safe circuit block, when three processor elements are specified by the control register, performs the operation corresponding to the ternary majority rule as processing realizing a functional safety for the three processor elements that perform in parallel the same data processing.

According to the above, the operation corresponding to TMR for three processor elements specified to be programmable can be realized easily.

[21] <Fail-Safe Control in Operation Corresponding to DLS>

In item 19, in the case where, when a first access request is issued from one of the processor elements, a second access request that coincides with the same can be determined through parallel execution of the same data processing by the prescribed two processor elements, the fail-safe circuit block executes a common access responding to the first access request and the second access request. In the case where, when the first access request is issued from one of the processor elements, the second access request that coincides with the same cannot be determined through parallel execution of the same data processing by the prescribed two processor elements, the fail-safe circuit block suspends execution of the first access request, and in the case where the second access request can be determined until passage of a predetermined time, the fail-safe circuit block releases the suspension of the first access request and executes a common access responding to the first access request and the second access request, and in the case where the second access request cannot be determined until passage of a predetermined time, the fail-safe circuit block performs the safety measure processing relating to the first access request. (Refer to FIGS. 2 to 4, and FIGS. 9 to 10.)

According to the above, a fail-safe control in the operation corresponding to DLS can be realized.

[22] <First Form of Fail-Safe Control in Operation Corresponding to TMR>

In item 20, in the case where, when a first access request is issued from one of the processor elements, a second access request and a third access request which coincide with the same can be determined through parallel execution of the same data processing by the prescribed three processor elements, the fail-safe circuit block executes a common access responding to the first access request, the second access request and the third access request. In the case where, when the first access request is issued from one of the processor elements, the second access request and the third access request which coincide with the same cannot be determined through parallel execution of the same data processing by the prescribed three processor elements, the fail-safe circuit block suspends execution of the first access request, and in the case where the second access request and the third access request can be determined until passage of a predetermined time, the fail-safe circuit block releases the suspension of the first access request and executes a common access responding to the access request relating to coincidence. In the case where either one of the second access request and the third access request can be determined until passage of the predetermined time, the fail-safe circuit block releases the suspension of the first access request and executes a common access responding to an access request relating to a coincidence and performs the safety measure processing relating to the other access request of the second access request or the third access request that cannot be determined. In the case where both the second access request and the third access request cannot be determined until passage of the predetermined time, the fail-safe circuit block performs the safety measure processing relating to the first access request, the second access request and the third access request. (Refer to FIGS. 5 to 7.)

According to the above, a fail-safe control in the operation corresponding to TMR can be realized.

[23] <Second Form of Fail-Safe Control in Operation Corresponding to TMR>

In item 20, in the case where, when a first access request is issued from one of the processor elements, a second access request and a third access request which coincide with the same can be determined through parallel execution of the same data processing by the prescribed three processor elements, the fail-safe circuit block executes a common access responding to the first access request, the second access request and the third access request. In the case where, when the first access request is issued from one of the processor elements, the second access request and the third access request which coincide with the same cannot be determined through parallel execution of the same data processing by the prescribed three processor elements, suspends execution of the first access request, and in the case where the second access request and the third access request can be determined until passage of a first time, the fail-safe circuit block releases the suspension of the first access request and executes a common access responding to the access request relating to coincidence. In the case where either one of the second access request and the third access request can be determined until passage of the first time, the fail-safe circuit block releases the suspension of the first access request and executes a common access responding to an access request relating to a coincidence and holds an access result in a buffer, and furthermore in the case where the other of the second access request or the third access request can be determined until passage of a second time, the fail-safe circuit block performs a control of returning the access result held in the buffer to respective access request sources as a result of responding to an access result relating to coincidence, and in the case where the other of the second access request or the third access request cannot be determined until passage of the second time, the fail-safe circuit block performs a control of returning the access result held in the buffer to respective access request sources as a result of responding to an access result relating to coincidence and performs the safety measure processing relating to an access request relating to non-coincidence. In the case where both the second access request and the third access request cannot be determined until passage of the first time, the fail-safe circuit block performs the safety measure processing relating to the first access request, the second access request and the third access request. (Refer to FIGS. 9 to 13.)

According to the above, a fail-safe control in the operation corresponding to TMR can be realized. In particular, it is possible to fix the processing while performing preceding access processing at the time when access requests from two processor elements among three coincide with each other and corresponding to coincidence/non-coincidence of one remaining access request.

2. Details of Embodiment

The embodiment will be described further in detail.
<<Multiprocessor System MPS_1>>

In FIG. 1, an example of a multiprocessor system is shown. The multiprocessor system MPS_1 in FIG. 1 has processor elements (PE) 1, 2 and 3 representatively shown, single or plural bus slave modules (BSLV) 4, and a bus interface unit 5. The multiprocessor system MPS_1 may be constituted of a single chip or may be constituted of multi chips. When the multiprocessor system MPS_1 is constituted of a single chip, although not particularly limited, the multiprocessor system MPS_1 can be formed on one semiconductor substrate such as single crystal silicon through the use of a CMOS integrated circuit manufacturing technology or the like.

Processor elements 1 to 3 are circuit modules that perform a program processing and that are used as a bus master, are referred to as, for example, a CPU core, a processor core or an accelerator, and are circuits that can execute a program to perform a required data processing.

The bus slave module 4 is a single or plural circuits that are accessible by processor elements 1 to 3, and means, for example, a memory device such as a RAM or an electrically rewritable nonvolatile memory, and, in addition, a storage device such as a register built in a peripheral circuit module.

The bus interface unit 5 has a bus interface control function and a fail-safe control function. The bus interface control function is, for example, a function that controls arbitration of access requests from processor elements 1 to 3 and routing between an access request source and an access request destination. As the bus interface control function, for example, a split transaction bus interface function may be adopted. The fail-safe control function is a control function for realizing fail-safe by an operation corresponding to DLS (Dual Lock Step) or TMR (ternary majority rule) for processor elements 1 to 3.

In FIG. 1, the bus interface unit 5 has master ports 11 to 13 to which processor elements 1 to 3 are coupled, a slave port 14 to which the bus slave module 4 is coupled, and a bus access arbitration circuit 15.

Each of master ports 11 to 13 has an access request flag (RFLG) 20, a bus access request queue (QREQ) 21, and an access result queue (QRSL) 22. The access request flag 20 is a flag register which is set when an access request from a corresponding master port exists and is cleared when the requested access has been completed. The bus access request queue 21 is a so-referred to as FIFO (First-In First-Out) buffer that queues bus access information such as an access target address from a corresponding master port, access type of read/write and write data at the time of write access. The access result queue 22 is a FIFO buffer that queues the access result obtained corresponding to the bus access request queued in the bus access request queue 21. The access result includes access end information showing normal end/abnormal end of an access and read data in the case of read access, and the like.

The bus access arbitration circuit 15 receives, via buses 30 and 31, a bus access request that is held by the access request flag (ARFLG) 20 and bus access information that is held by the bus access request queue 21 of each of master ports 11 to 13 and determines the presence or absence of an access competition. When there is no competition, the bus access arbitration circuit 15 gives bus access information answering the access request to the slave port 14, and waits for access completion from the bus slave module 4. When it is a write access, the circuit receives access end information, and when it is reading, the circuit receives access end information and read data. The received information is returned to a processor element of the bus access request source via a bus 32, and is stored in the access result queue 22. When a competition is present, the bus access arbitration circuit 15 arbitrates access requests based on priorities or the like, and performs the same access control processing as described above on one access request. In the bus access request, although not particularly limited, ID information that specifies the access request source is included, and in the bus request information, ID information that specifies the access request source and address information that specifies the access specification are included. The access end information and read data are given to the corresponding master port that uses ID information of the access request source.

The access control processing of arbitration and routing by the bus access arbitration circuit 15 is controlled for an access request, for example, by three modes of execution/ suspension/cancellation. The control enables fail-safe functions by the operation corresponding to DLS and the operation corresponding to TMR. Hereinafter, the control function will be described in detail.

A fail-safe circuit block 70 for realizing a fail-safe function by the bus interface unit 5 includes, for example, the bus access information storage circuit 40, the bus access information comparator 41, the bus access determination/control circuit 42, the time measurement device 43, the control register 44, and the status flag register 45.

The bus access information storage circuit 40 holds bus access information outputted from master ports 11 to 13 to the bus 31, and has hold regions (first region, second region, and third region) individualized to each of master ports 11, 12, and 13.

The bus access information comparator 41 makes a comparison of values among regions individualized to each of master ports 11, 12, and 13, and determines whether or not the information in the first region coincides with the information in the second region, whether or not the information in the first region coincides with the information in the third region, and whether or not the information in the second region coincides with the information in the third region.

The bus access determination/control circuit 42 determines whether or not a bus access request via the bus 30 is present. A bus access request from which processor element should be determined is set to be programmable by control-setting information of the control register 44. A bus access determination/control circuit 42A inputs a comparison result 51 by the bus access information comparator 41 to thereby determine coincidence/non-coincidence of a plurality of bus access information, for a bus access request to be determined, and based on the determination result, controls execution/suspension/cancellation of an access control processing by the bus access arbitration circuit 15 corresponding to the access request, by a control signal 50. Furthermore, a bus access determination/control circuit 42 outputs a signal 53 instructing an interrupt request or a reset request for the processor element corresponding to the request source of an access request or for another processor element to be a comparison target of the access request, when the bus access determination/control circuit 42 performs access control processing of cancellation. Whether the request by the signal 53 is an interrupt request or a reset request, and in addition, which processor element is the request specification, and the like are determined in accordance with setting contents of the control register 44. As the reference timing for the comparison result 51, for example, timing of timeout by a timer operation of the time measurement device 43 is used. The setting of the control register 44 may be performed by any of processor elements, or may be performed by another logic. The setting of timer time for the time measurement device 43 is performed by the setting for the control register 44. The start and stop of the timer operation using the set timer time are carried out by the bus access determination/control circuit 42. The status flag register 45 holds a state of processor elements 1 to 3. For example, the status flag register 45 holds states such as during stop of an operation, during reset processing and the like, together with the ID of the processor element.

The fail-safe control function by the bus access determination/control circuit 42 is, although not particularly limited, classified broadly to the operation corresponding to DLS and the operation corresponding to TMR. Which operation control is to be performed is, although not particularly limited, determined by the setting of mode bit of the control register 44. When specifying the operation corresponding to DLS, for example, two processor elements to be comparison targets of an access request may be specified by the control register 44. When specifying the operation corresponding to TMR, three processor elements to be comparison targets of an access request may be specified by the control register 44. The specification as to which operation control is to be performed is not limited to the above, but may be set so that the operation corresponding to DLS is to be specified when the number of processor elements to be comparison targets of an access request is 2, and so that the operation corresponding to TMR is to be specified when the number of processor elements to be comparison targets of an access request is 3.

The basic concept of the fail-safe control here is, while focusing on the fact that the case where abnormality of a processor element causes a failure to a system is a case where the processor element performs erroneous processing toward the outside, to detect the state where access requests by a plurality of processor elements having been set so as to perform the same program processing operation are different from each other and to determine it to be abnormal, as a technique for broadly detecting the error. In the determination, in the case where two processor elements are set to be comparison targets, when an access request is present from one processor element and the same access request from another processor element is absent, both access requests are determined to be abnormal. By performing the same determination several times while changing the combination of two processor elements to be comparison targets, the specification of a processor element having generated a failure becomes possible. In the case where an access request is present from one processor element when three processor elements are set to be comparison targets, and at least one access request from another processor element is present, a normal access is performed within the range, and in the case where the access request from the remaining one processor element is different, the one processor element can be determined to be in a failure state.

Specific examples of the fail-safe control methods broadly classified into the operation corresponding to DLS and the operation corresponding to TMR in the multiprocessor system MPS_1 in FIG. 1 will be explained. In the multiprocessor system MPS_1 in FIG. 1, when specified processor elements among processor elements 1 to 3 execute normally the same program, each of the processor elements is set to operate at the same timing. The same timing relating to the bus access means that, for example, when an access request is performed, a part of processor elements does not perform in advance the subsequent access request.

<<Operation Corresponding to DLS Using Multiprocessor System MPS_1>>

Figure 2:
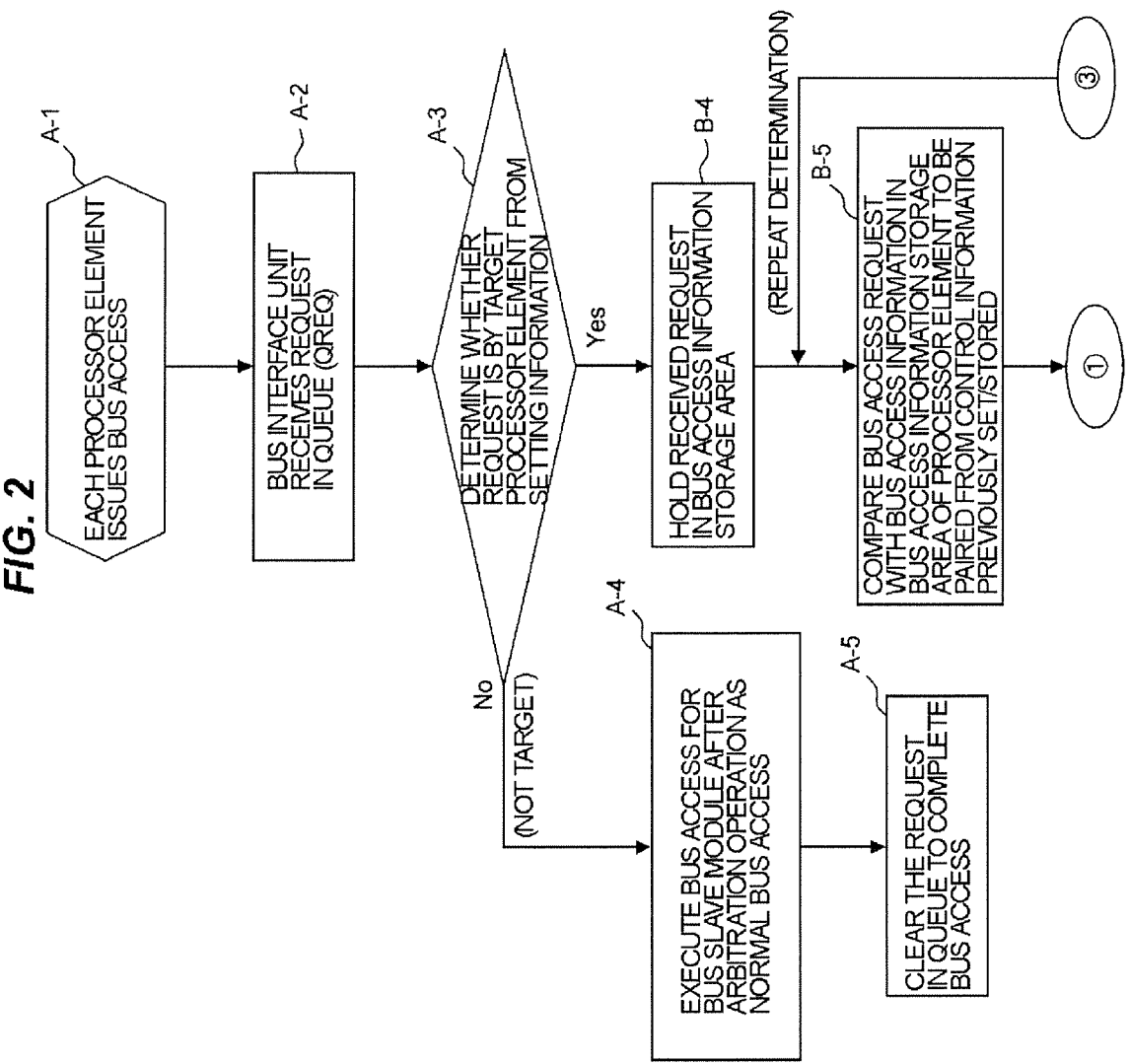
FIG. 2 is an operation flow chart when an operation corresponding to DLS is performed while specifying two processor elements.
Figure 3:
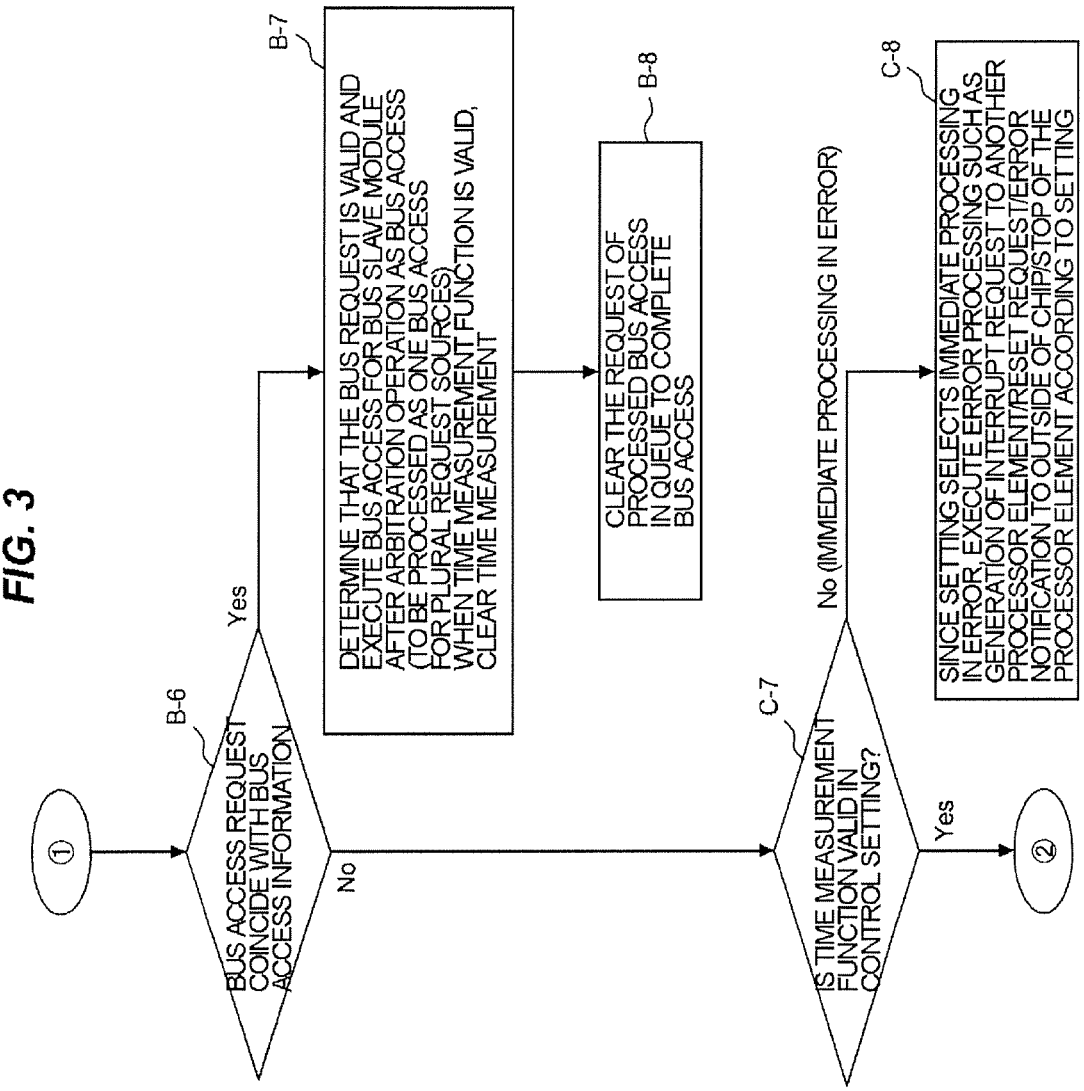
FIG. 3 is an operation flow chart following FIG. 2.
Figure 4:
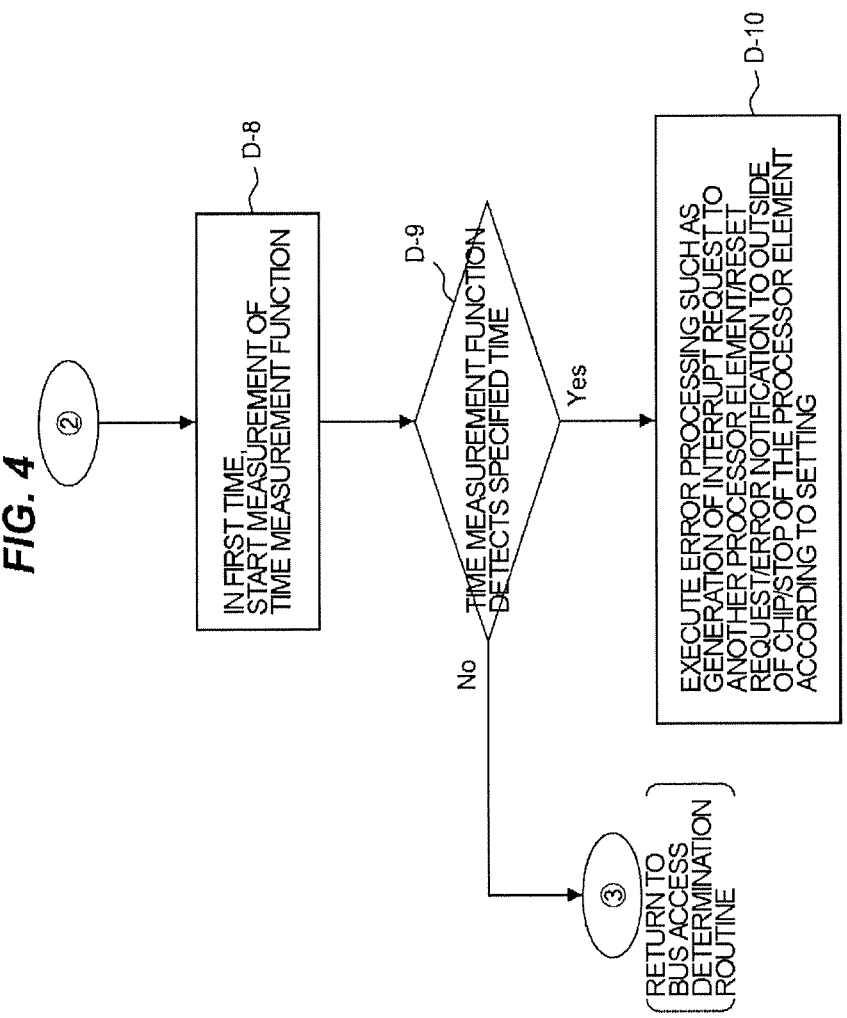
FIG. 4 is an operation flow chart following FIG. 3.

In FIGS. 2 to 4, an operation flow when specifying two processor elements to thereby perform the operation corresponding to DLS is exemplified.

Required two processor elements among processor elements 1 to 3 are specified by the control register 44, and the operation corresponding to DLS is set. The specified two processor elements execute in parallel the same program.

When a bus access is issued at a required timing according to the program execution of processor elements 1 to 3 (A-1), the bus interface unit 5 receives the request in the bus access request queue (QREQ) 21, and the access request flag 20 is set (A-2). The bus access determination/control circuit 42 determines whether or not the access request is a request by the processor element to be a target of the operation corresponding to DLS (the processor element specified by control register 44) based on the set access request flag (A-3).

When the access request is not a target of the operation corresponding to DLS, the bus access determination/control circuit 42 allows the bus access arbitration circuit 15 to perform an arbitration operation for the access request by the signal 50 and causes the bus access module 4 to execute the bus access (A-4). The bus access arbitration circuit 15 queues the execution result of the bus access in the access result queue 22 of the master port relating to the access request, and causes the master port to clear the access request flag 20 (A-5).

On the other hand, when the access request is a target of the operation corresponding to DLS, the bus access information received in the bus access request queue (QREQ) 21 is held in the bus access information storage circuit 40 (B-4). The bus access information comparator 41 compares the bus access information that has been held this time with information in a region of the bus access information storage circuit 40 for the processor element to be the target of the operation corresponding to DLS (B-5). As the result of the comparison, whether or not the two pieces of bus access information coincide with each other is determined (B-6).

When the determination result in Step B-6 shows coincidence, since it means that the same access request has been issued from two processor elements being the targets of the operation corresponding to DLS, it is known that the bus access request is a valid access request. Therefore, the bus access determination/control circuit 42 enables the bus access arbitration circuit 15 to thereby perform an arbitration operation on the access request by the signal 50 to execute a bus access for the bus slave module 4 (B-7). The bus access for the bus slave module 4 this time becomes one common bus access for access requests issued separately from two processor elements. When a timer operation by the time measurement device 43 has been started, the timer operation is cleared even before timeout (B-7). The bus access arbitration circuit 15 queues the execution result of the bus access in the result queue 22 of two master ports 20 relating to the target of the operation corresponding to DLS, and causes the master port to clear the access request flag 20 relating to the coincidence of access requests (B-8).

On the other hand, when the result of the determination result in Step B-6 shows non-coincidence, whether or not a timer operation by the time measurement device 43 is valid (timer operation has been started) is determined (C-7). When the timer operation is not valid, immediate exceptional processing for non-coincidence determination of the access request has been specified by the signal 53 or the like. For example, according to the specification of an exceptional processing for the control register 44, the generation of an interrupt request or a reset request for the other side processor element relating to the operation corresponding to DLS, an exceptional processing request for the outside of the chip of the multiprocessor system MPS_1 made into a single chip, or an instruction of operation stop of the processor element relating to the access request this time is performed (C-8).

In the case where the timer operation is determined to be valid by the determination result in Step C-7, when the timer operation has not been activated, the timer operation is started (D-8), and whether specified time has been measured by the timer operation (whether timed out) is determined (D-9). When timeout has not been achieved, the flow returns to Step B-5 and the above processing is repeated, and when timeout has been achieved, as is the case for Step C-8, exceptional processing for non-coincidence determination of the access request has been specified by the signal 53 or the like, and for example, the generation of an interrupt request or a reset request for the other side processor element relating to the operation corresponding to DLS, an exceptional processing request for the outside of the chip of the multiprocessor system MPS_1 made into a single chip, or an instruction of operation stop of the processor element relating to the access request this time is performed (D-10).

In the flow charts in FIGS. 2 to 4, for example, the progress form of processing steps in which processor elements 1, 2 are caused to operate in the same way in parallel and the processor element 3 is caused to operate separately from these, shown in an organized manner, is as follows.

(1) Processing is performed on the bus access request by the processor element 3, in order of Steps A-1, A-2, A-3, A-4 and A-5, and the bus access is completed.

(2) At the time of the normal operation of the processor elements 1 and 2, the processing is performed in order of Steps A-1, A-2, A-3, B-4, B-5, and B-6 (determination is coincident), B-7 and B-8, and the bus access is completed.

(3) In the case where there exists no difference in operation timing at the time of an abnormal operation of processor elements 1 and 2, the processing is performed in order of Steps A-1, A-2, A-3, B-4, B-5, and B-6 (determination is non-coincident), C-7 and C-8, and the case where bus access information is non-coincident is immediately determined to be abnormal and exceptional processing is performed on the error.

(4) In the case where the bus access information had once become non-coincident due to the abnormal operation of the processor elements 1 and 2 and is also non-coincident after the lapse of a prescribed time, the processing is performed in order of Steps A-1, A-2, A-3, B-4, B-5, and B-6 (determination is non-coincident), C-7, D-8, and D-9 (repetition of from B5 to D9) and D-10, and the case where the bus access information is non-coincident also after the lapse of a prescribe time is determined as abnormal and exceptional processing is performed on the error.

(5) In the case where bus access information had once become non-coincident due to an abnormal operation of processor elements 1 and 2 and becomes coincident before the lapse of a prescribed time, the processing is performed in order of Steps A-1, A-2, A-3, B-4, B-5, and B-6 (determination is non-coincident), C-7, D-8, and D-9 (repetition of from B5 to D9), B-6 (determination is coincident), B-7 and B-8, and the bus access is completed.

<<Operation Corresponding to TMR Using Multiprocessor System MPS_1>>

In FIGS. 5 to 7, an operation flow when an operation corresponding to TMR is performed by specifying three processor elements is exemplified.

Three processor elements 1 to 3 are specified by the control register 44, and the operation corresponding to TMR is set. The specified three processor elements execute in parallel the same program.

When bus access is issued at a required timing according to the program execution of processor elements 1 to 3 (A-11), the bus interface unit 5 receives the request in the bus access request queue (QREQ) 21, and the access request flag 20 is set (A-12). The bus access determination/control circuit 42 determines whether or not the access request is a request by the processor element to be the target of the operation corresponding to DLS (the processor element specified by the control register 44) based on the set access request flag (A-13).

When the access request is not the target of the operation corresponding to TMR, the bus access determination/control circuit 42 enables the bus access arbitration circuit 15 to perform an arbitration operation on the access request by the signal 50 and causes the bus slave module 4 to execute the bus access (A-14). The bus access arbitration circuit 15 queues the execution result of the bus access in the access result queue 22 of the master port relating to the access request, and causes the master port to clear the access request flag 20 (A-15). Note that, in the example of the multiprocessor system MPS_1 in FIG. 1, since only the three processor elements are mounted and the operation corresponding to ternary majority rule is performed using three processor elements, processing passing through the pathway of Steps A-11 to A-15 is not generated.

When the access request is a target of the operation corresponding to TMR, the bus access information received in the bus access request queue (QREQ) 21 is held in the bus access information storage circuit 40 (B-14). The bus access information comparator 41 compares the bus access information that has been held this time with information in a region of the bus access information storage circuit 40 for the processor element to be the target of the operation corresponding to DLS (B-15). As the result of the comparison, whether or not the two pieces of bus access information coincide with each other is determined (B-16). In a mode of the operation corresponding to TMR, coincidence of the determination result in Step B-16 means the coincidence with other one bus access information, or the coincidence with other two pieces of bus access information. Non-coincidence of the determination result means the non-coincidence with other one bus access information, or the non-coincidence with other two pieces of bus access information. That is, there are three results such that all of bus access requests from three processor elements are coincident, two access requests among three are coincident, and all of these are non-coincident. Since coincidence of two access requests means non-coincidence of one access request, the determination result in Step B-16 branches into both "coincidence" and "non-coincidence." Note that the determination operation in Step B-16 is performed during the period of the lapse of a prescribed time by the timer operation by the time measurement device 43, and illustration of the processing shown in Steps D-8 and D-9 is omitted.

When the determination result in Step B-16 shows coincidence, since the same access request has been issued from two processor elements or three processor elements being the targets of the operation corresponding to TMR, it is known that the bus access request is a valid access request. Therefore, the bus access determination/control circuit 42 enables the bus access arbitration circuit 15 to perform an arbitration operation for the access request by the signal 50 and executes a bus access for the bus slave module 4 (B-17). The bus access for the bus slave module 4 this time serves as one common bus access for access requests issued separately from two or three processor elements. When a timer operation by the time measurement device 43 has been started, the timer operation is cleared even before timeout (B-17). The bus access arbitration circuit 15 queues the execution result of the bus access in the result queue 22 of two or three master ports 20 relating to the target of the operation corresponding to TMR, and causes the master port to clear the access request flag 20 relating to the coincidence of access requests (B-18).

When the determination result in Step B-16 shows non-coincidence, whether or not the result is non-consistent with other two pieces of bus access information (namely, in a state where or not all bus access requests from three processor elements are non-coincident) is determined (C-17). When all of these are determined to be non-coincident, immediate exceptional processing for non-coincidence determination of the access request has been specified by the signal 53 or the like. For example, in accordance with the specification of exceptional processing for the control register 44, the generation of an interrupt request or a reset request for the other side processor element relating to the operation corresponding to TMR, an exceptional processing request for the outside of the chip of the multiprocessor system MPS_1 made into a single chip, or an instruction of operation stop of the processor element relating to the access request this time is performed (C-18).

When the determination result in Step C-17 is that not all of these are non-coincident, namely, for the abnormality of one processor element relating to the non-coincidence of the bus access information, whether or not the processing by the processor element is to be continued is determined based on the set value of the control register 44. When the continuation of the processing is instructed, the bus access determination/control circuit 42 cancels the bus access request this time by the processor element relating to the abnormality, via the signal 50. This state is informed to the other processor elements or to the outside of the multiprocessor system MPS_1, as an error by the signal 53, according to the setting of the control register 44 (D-19). When the continuation of the processing is not instructed, the bus access of the processor element relating to the abnormality is stopped by the signal 53, and, in addition, is informed to the other processor elements or to the outside of the multiprocessor system MPS_1 chip made into a single chip as an error according to the specification of an exceptional processing for the control register 44 (E-20).

Note that, in flow charts in FIGS. 2 to 7, the A series of processing step number is a pathway serving as an execution pathway by a single processor element, and the B series is a pathway in the case where parallel executions by a plurality of processor elements bring about a coincidence determination. The C series is a pathway leading to error processing of non-coincidence. When all the processor elements are non-coincident, the operation continuation is not possible. The D series shows the case where one processor element is abnormal and the continuation of processing of the processor element relating to the abnormality is made possible subsequent to the cancellation of the bus access. The E series shows the case where one PE is abnormal and the bus access of the processor element relating to the abnormality is stopped.

According to the above-described multiprocessor system MPS_1, the following operation effect can be obtained. In conventional technologies, functional safety and operation continuity were realized by ensuring the output of processor elements through the use of duplication by DLS or ternary majority rule by TMR, based on hardware. However, since the combination and configuration are determined by the hardware, it is necessary to make the combination and configuration redundant irrespective of the difference in use applications of individual users, and furthermore, a timely reconfiguration of the configuration by a user is extremely difficult. In the multiprocessor system MPS_1, the functional safety and operation continuity can be realized arbitrarily at low cost by specifying validity/invalidity of a fail-safe function for an individual processor element and the combination of processor elements to be targeted, in the control register 44 by a software, as a function built in the bus interface unit.

Furthermore, since the fail-safe control is performed based on a bus access unit, by the setting in the control register 44 for specified processing in a program (thread) by software, a user can realize a functional safety operation freely at an arbitrary timing.

In the case of a system including a plurality of processor elements, even when trouble occurs in a specified processor element, the operation corresponding to DLS or the operation corresponding to TMR can be selected based on an arbitrary combination of processor elements, and the reconfiguration relating to the fail-safe function can be performed easily at low cost.

<<Multiprocessor System MPS_2>>

Figure 8:
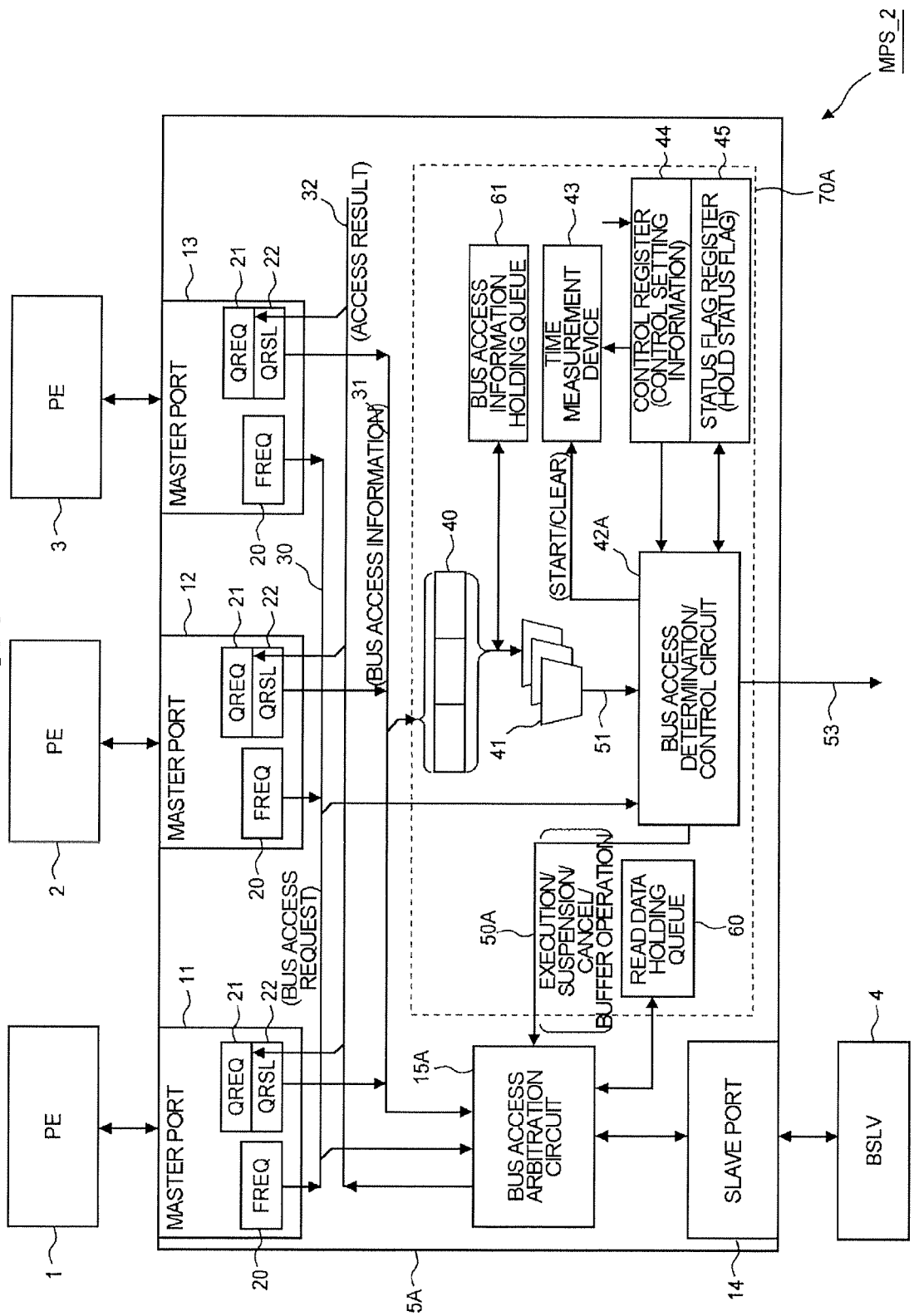
FIG. 8 is a block diagram showing a second example of a multiprocessor system.
Figure 9:
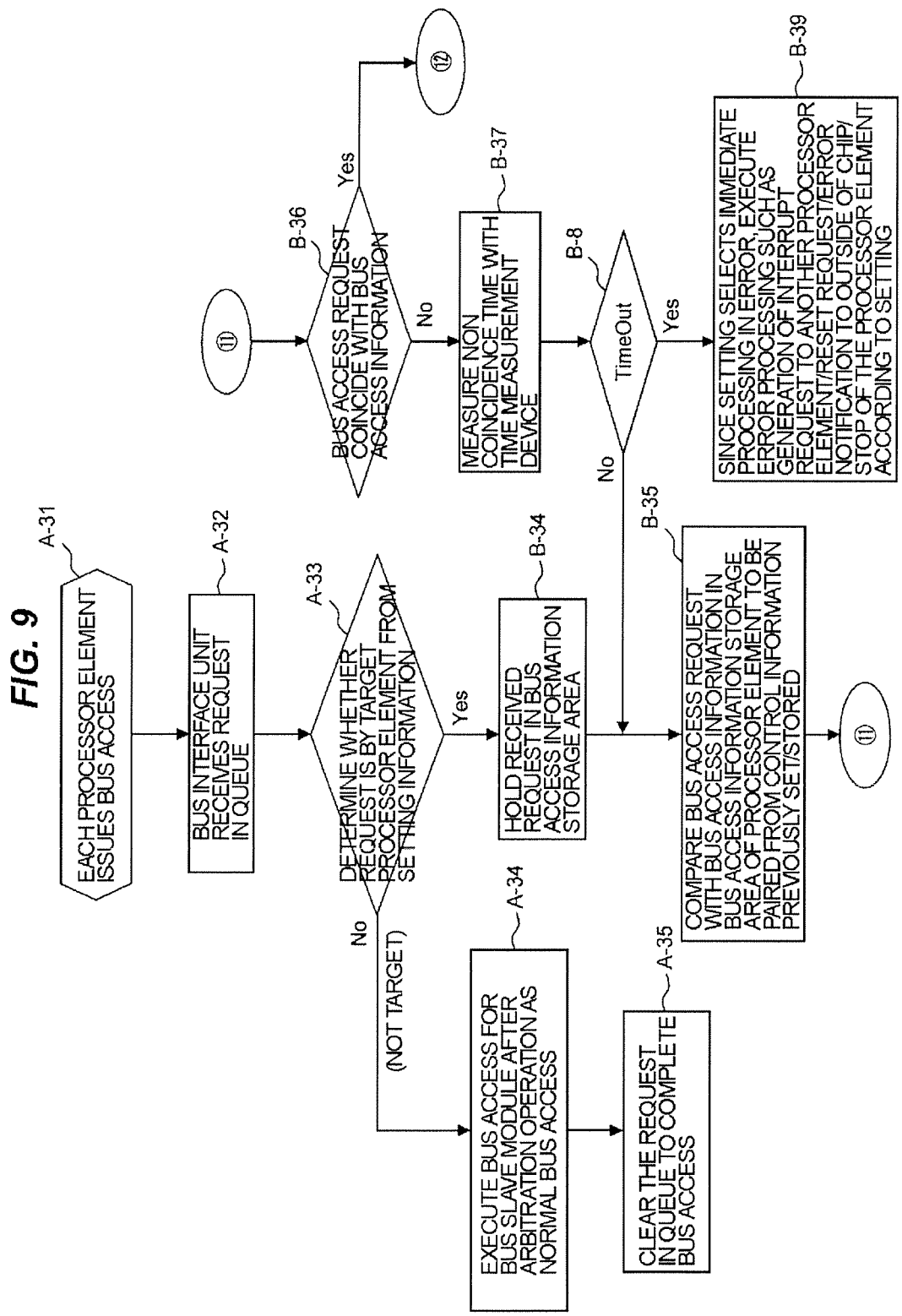
FIG. 9 is an operation flow chart showing a fail-safe control operation of a multiprocessor system MPS_2.
Figure 10:
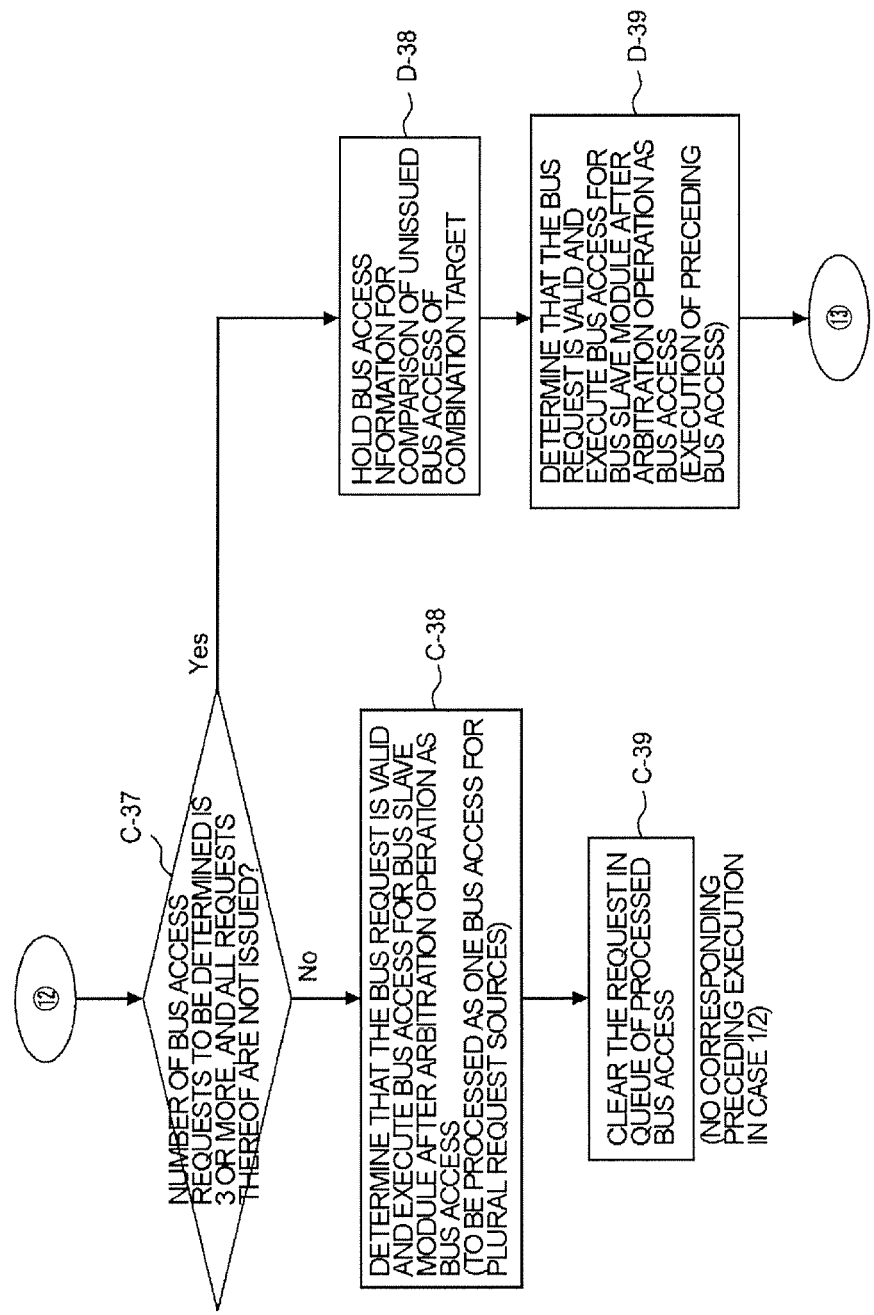
FIG. 10 is an operation flow chart following FIG. 9.
Figure 11:
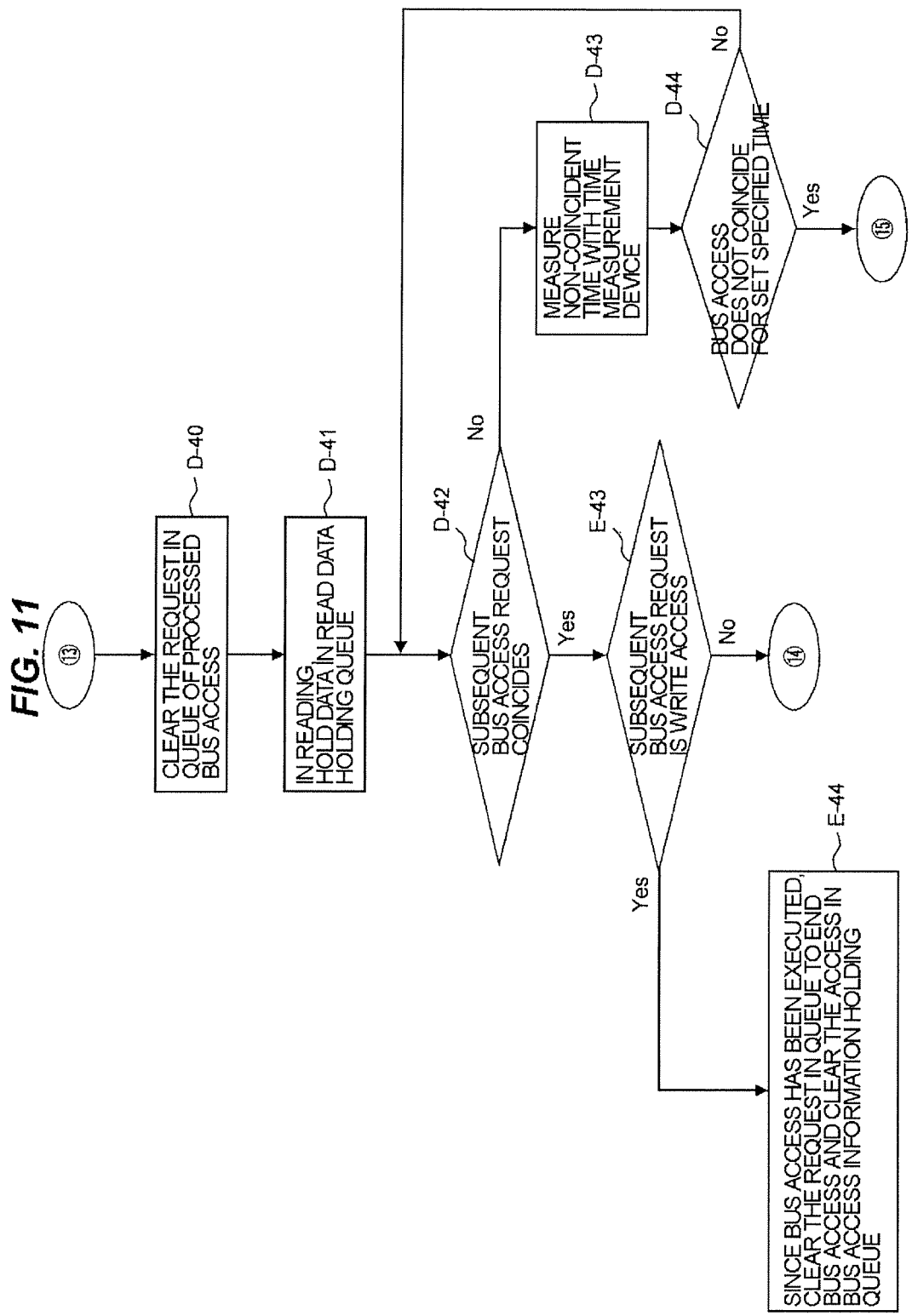
FIG. 11 is an operation flow chart following FIG. 10.
Figure 12:
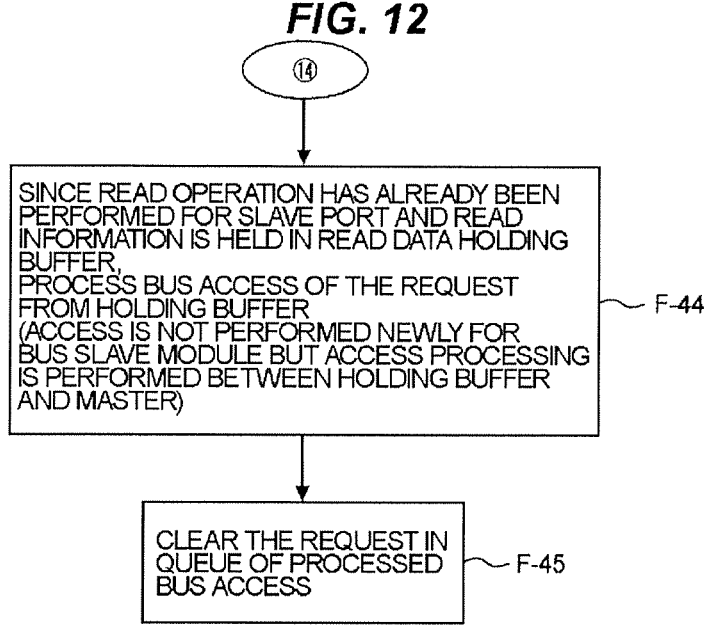
FIG. 12 is an operation flow chart following FIG. 11.
Figure 13:
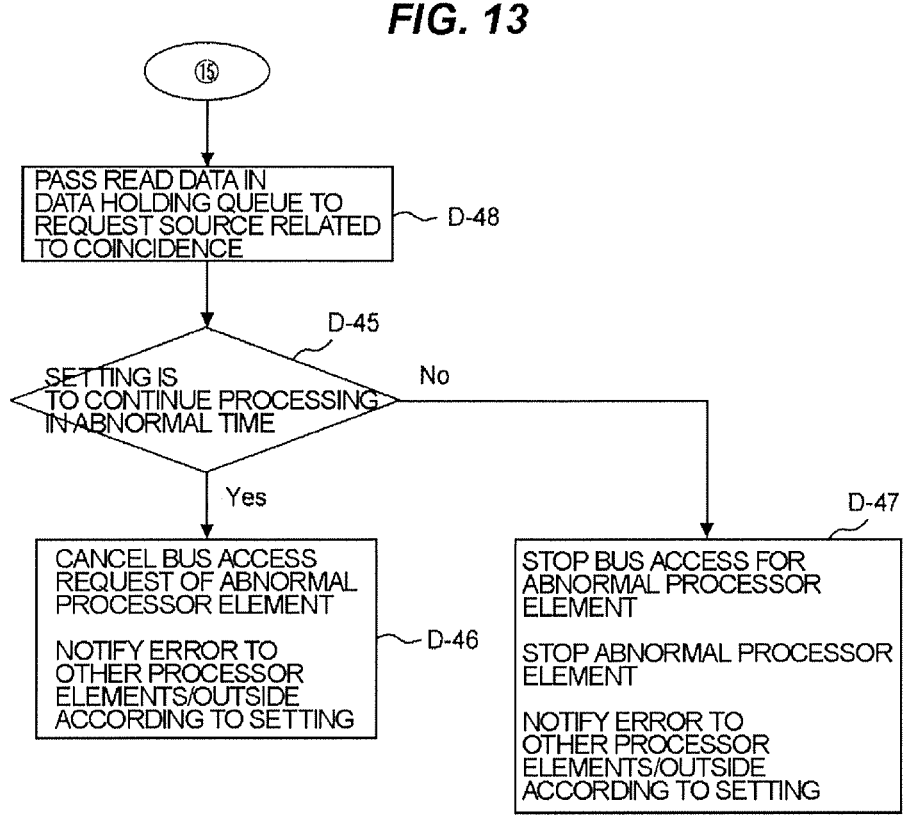
FIG. 13 is an operation flow chart following FIG. 12.

In FIG. 8, a second example of the multiprocessor system is shown. In the case of the multiprocessor system MPS_1 in FIG. 1, the configuration in which timing is controlled so that the operation timing of parallel operations by a plurality of processor elements executing the same program is equal, is assumed in both of the operation corresponding to DLS and the operation corresponding to TMR, and thus the configuration is such that the issue of the same bus access request by a plurality of processor elements to be operated in parallel does not shift over plural times of a command execution cycle. For example, it is realized by making the hardware of processor elements 1 to 3 completely same or by the execution of the same software. In contrast, in the multiprocessor system MPS_2 in FIG. 8, there is assumed the case where the coincidence of the operation timing by an individual processor element is not guaranteed or the guarantee is not sufficient.

The multiprocessor system MPS_2 in FIG. 8 is equipped with a bus interface unit 5A, which is different when compared with the multiprocessor system MPS_1 in FIG. 1 in that a read data holding queue 60 and a bus access information holding queue 61 are added, and in accordance with it, a new control function is added to the bus access determination/control circuit 42A and the bus access arbitration circuit 15A. The other configurations are the same as those of the multiprocessor system MPS_1, and the configuration having the same function is given the same sign and a detailed explanation thereof is omitted. In the multiprocessor system MPS_2 in FIG. 8, 70A shows a fail-safe circuit block for realizing the fail-safe function by the bus interface unit 5A.

The bus access information holding queue 61 functions as a save region that holds temporarily the bus access information once held in the bus access information storage circuit 40 according to the control of the bus access determination/control circuit 42A. For example, the bus access information holding queue 61 holds the bus access information of two regions relating to the coincidence of the bus access information by the bus access information comparator 41. Accordingly, the bus access information comparator 41 not only compares values between mutual regions of the bus access information storage region 40 individualized to each of master ports 11, 12, and 13 to thereby determine whether or not the information in a first region and the information in a second region coincide with each other, whether or not the information in the first region and the information in a third region coincide with each other and whether or not the information in the second region and the information in the third region coincide with each other, but also compares the bus access information of two regions saved in the bus access information holding queue 61 and the bus access information of the other region in the bus access information storage region 40, as necessary. For example, when the bus access information in the first and second regions relating to the coincidence is saved in the bus access information holding queue 61, the bus access information is compared with the bus access information in the third region of the bus access information storage region 40, as necessary.

The read data holding queue 60 functions as a save region that holds temporarily the data read via the slave port 14 according to the control of the bus access determination/control circuit 42A. For example, when the operation corresponding to TMR is specified, the read data holding queue 60 holds data read from the bus slave module 4 based on the two pieces of bus access information relating to the coincidence. In the operation corresponding to TMR, the bus access requests by the individuals coincide with one another when three processor elements operate normally, but since the coincidence of the operation timing by three processor elements 1 to 3 is not guaranteed, it is configured such that, while assuming the situation where bus access requests by two processor elements coincide with each other, and after that, another access request intervenes before the arrival of the bus access request by the remaining processor element, when the same access request as the access request relating to the coincidence is issued after that by the remaining processor element, uselessness of performing repeatedly the same access is eliminated through the use of the read data saved in the read data holding queue 60.

The bus access determination/control circuit 42A determines whether or not a bus access request via the bus 30 is present. A bus access request from which processor element should be determined is set to be programmable by control-setting information of the control register 44. For a bus access request to be determined, a bus access determination/control circuit 42A inputs a comparison result 51 by the bus access information comparator 41 to thereby determine coincidence/non-coincidence of a plurality of bus access information, and based on the determination result, controls execution/suspension/cancellation of an access control processing by the bus access arbitration circuit 15 corresponding to the access request, by a control signal 50. The buffer operation is a push/pop operation of the read data holding queue 60. Furthermore, a bus access determination/control circuit 42A outputs a signal 53 instructing an interrupt request or a reset request for the processor element corresponding to the request source of an access request or for another processor element to be a comparison target of the access request, when the bus access determination/control circuit 42 performs access control processing of cancellation. Whether the request by the signal 53 is an interrupt request or a reset request, and in addition, which processor element is the request specification, and the like are determined in accordance with setting contents of the control register 44. As the reference timing for the comparison result 51, for example, timing of timeout by a timer operation of the time measurement device 43 is used. The setting of the control register 44 may be performed by any of processor elements, or may be performed by another logic. The setting of timer time for the time measurement device 43 is performed by the setting for the control register 44. The start and stop of the timer operation using the set timer time are carried out by the bus access determination/control circuit 42. The status flag register 45 holds a state of processor elements 1 to 3. For example, the status flag register 45 holds states such as during stop of an operation, during reset processing and the like, together with the ID of the processor element.

The fail-safe control function by the bus access determination/control circuit 42A is classified broadly, in the same way as above, into the operation corresponding to DLS and the operation corresponding to TMR, and for example, is determined by the setting of mode bit of the control register 44.

The basic concept of the fail-safe control here is, while focusing on the fact that the case where abnormality of a processor element causes a failure to a system is a case where the processor element performs erroneous processing toward the outside, to detect the state where access requests by a plurality of processor elements having been set so as to perform the same program processing operation are different from each other and to determine it to be abnormal, as a technique for broadly detecting the error. In the determination, in the case where two processor elements are set to be comparison targets, when an access request is present from one processor element and the same access request from another processor element is absent, both access requests are determined to be abnormal. By performing the same determination several times while changing the combination of two processor elements to be comparison targets, the specification of a processor element having generated a failure becomes possible. In the case where an access request is present from one processor element when three processor elements are set to be comparison targets, and at least one access request from another processor element is present, a normal access is performed within the range, and in the case where the access request from the remaining one processor element is different, the one processor element can be determined to be in a failure state. In the case of the multiprocessor system MPS_2, the case where the coincidence of operation timing by an individual processor element is not guaranteed or the guarantee is not sufficient is assumed, and thus, when remaining one processor element has performed an access request after that, there is performed a control in which the access information having been saved in the bus access information holding queue 61 is set as a comparison target for coincidence determination of access request information, and when the comparison shows coincidence, the data saved in the read data holding queue 60 is used as read data.

<<Fail-Safe Control Operation of Multiprocessor System MPS_2>>

In FIGS. 9 to 13, an operation flow of the fail-safe control operation of the multiprocessor system MPS_2 is exemplified. Here, the processing corresponding to both operations is shown by a series of operation flow, without separating a flow of the operation corresponding to DLS and a flow of the operation corresponding to TMR.

Required plurality of (two or three) processor elements among processor elements 1 to 3 is specified by the control register 44, the operation corresponding to DLS or the operation corresponding to TMR is set. The specified plurality of processor elements executes in parallel the same program.

When a bus access is issued at a required timing according to the program execution of processor elements 1 to 3 (A-31), the bus interface unit 5A receives the request in the bus access request queue (QREQ) 21, and the access request flag 20 is set (A-32). The bus access determination/control circuit 42A determines whether or not the access request is a request by the processor element to be a target of the operation corresponding to DLS or the operation corresponding to TMR (the processor element specified by the control register 44) based on the set access request flag (A-33).

When the access request is not a target of the operation corresponding to DLS and the operation corresponding to TMR, the bus access determination/control circuit 42A enables the bus access arbitration circuit 15A to perform an arbitration operation for the access request by the signal 50A and causes the bus slave module 4 to execute the bus access (A-34). The bus access arbitration circuit 15A queues the execution result of the bus access in the access result queue 22 of the master port relating to the access request, and causes the master port to clear the access request flag 20 (A-35).

On the other hand, when the access request is a target of the operation corresponding to DLS or the operation corresponding to TMR, the bus access information received in the bus access request queue (QREQ) 21 is held in the bus access information storage circuit 40 (B-34). The bus access information comparator 41 compares the bus access information that has been held this time, with information in a region of the bus access information storage circuit 40 for the processor element to be the target of the operation corresponding to DLS or the operation corresponding to TMR (B-35). As the result of the comparison, whether or not the two pieces of bus access information coincide with each other is determined (B-36).

When the determination result in Step B-6 shows non-coincidence, a timer operation by the time measurement device 43 is started if the timer operation has not been started (B-37), and whether or not specified time has been measured (timed out) is determined by the timer operation (B-38). When timeout is not determined, the Step returns to Step B-35 and the above-described processing is repeated, and when timeout is determined in Step B-38, immediate exceptional processing for non-coincident determination of the access request is specified by the signal 53 or the like. For example, in accordance with the specification of exceptional processing for the control register 44, an instruction is performed such as a generation of an interrupt request or reset request for the processor element of the other side relating to the operation corresponding to DLS or the operation corresponding to TMR; an exceptional processing request to the outside of the multiprocessor system MPS_2 chip made into a single chip; or operation stop of the processor element relating to the access request this time (B-39).

When the determination result in Step B-36 shows coincidence, whether or not the number of bus access request to be determined is three or more and all the requests thereof have not been issued are determined (C-37). That is, whether or not the coincidence with other two pieces of bus access information (all the bus access requests from three processor elements coincide with one another) or coincidence with the other one bus access information (bus access requests from two processor elements coincide with each other) is determined. In the case where the determine result shows coincidence with other two pieces of bus access information or shows coincidence with other one bus access information (determination in C-37 is "No"), the same access request has been issued from all the plurality of processor elements being the target of the operation corresponding to DLS or the operation corresponding to TMR, and thus it is known that the bus access request is a valid access request. Hereby, the bus access determination/control circuit 42A enables the bus access arbitration circuit 15A to perform an arbitration operation for the access request by the signal 50A and executes a bus access for the bus slave module 4 (C-38). The bus access for the bus slave module 4 this time serves as one common bus access for access requests issued separately from a plurality of processor elements. The bus access arbitration circuit 15A queues the execution result of the bus access in the result queue 22 of a plurality of master ports 20 relating to the target of the operation corresponding to DLS or TMR, and causes the master port and clears the access request flag 20 relating to the coincidence of access requests (C-39).

When the result of the determination in Step C-37 shows neither coincidence with other two pieces of bus access information nor coincidence with other one bus access information (the determination result in C-37 is "Yes"), only the access information from two among three processor elements coincides with each other in the operation corresponding to TMR and the remaining one processor element has not issued a bus access request. In this case, the bus access determination/control circuit 42A causes the bus access information having previously coincided to be saved in the bus access information holding queue 61, as the comparison target for bus access information to be outputted from the remaining one processor element (D-38).

Furthermore, the bus access determination/control circuit 42A enables the bus access arbitration circuit 15A to perform an arbitration operation for two access requests having previously coincided by the signal 50A to thereby execute a bus access (preceding bus access) for the bus slave module 4 (D-39).

Subsequently, the bus access arbitration circuit 15A causes the access request flag 20 of two master ports 20 corresponding to the access request relating to the preceding bus access to be cleared (D-40) and, when the preceding bus access is read access, causes read data thereby read to be saved in the read data holding queue 60 (D-41).

Then, the bus access arbitration circuit 15A determines whether or not the succeeding bus access request is the remaining one access request in the operation corresponding to TMR by using the bus access information saved in the bus access information holding queue 61 (D-42). However, the class of the access (read/write) is determined in following Step E-43. When coincidence is determined in Step D-42 and the bus access is determined to be write access in Step E-43, since necessary write access has already been completed, the access request flag 20 relating to the remaining one access request and data held by data holding queues 60 and 61 are cleared (E-44). When the bus access is determined to be read access in Step E-43, since necessary read data has already been acquired in the read data holding queue 60, for the remaining one access request, the read data of the read data holding queue 60 is delivered to the request source thereof (F-44), and the access request flag 20 relating to the remaining one access request and the data held by data holding queues 60 and 61 clear the holding data (F-45).

In the case where the access request shows non-coincidence is determined in Step D-42, if a timer operation by the time measurement device 43 has not been activated, it is activated (D-43) and whether or not a predetermined time has been measured by the timer operation (timed out) is determined (D-44). When the timer does not take timeout, the flow returns to Step D-42 and the above-described processing is repeated. When timeout is determined in Step D-44, the remaining one bus access request does not coincide in the operation corresponding to TMR, and the read data held beforehand in the read data holding queue 60 according to two bus access requests having already coincided with each other is delivered to the processor elements of the access request source relating to the coincidence (D-48). Next, the content of error processing in accordance with the setting of the control register 44 is determined (D-45). Namely, is determined whether or not the continuation of the processing of processor element having generated abnormality and not having issued remaining one coincident bus access request is to be made possible. When the continuation is allowed, the bus access determination/control circuit 42A causes the bus access arbitration circuit 15A to cancel the bus access request relating to the non-coincidence this time, by the signal 50 A, and for example, according to the specification of exceptional processing for the control register 44, performs an error notification to the processor element of the other side of the processor element having already shown the coincidence of the access request relating to the operation corresponding to TMR or to the outside of the multiprocessor system MPS_2 chip made into a single chip (D-46). On the other hand, when the continuation is not allowed, the bus access determination/control circuit 42A stops the subsequent bus access of the processor element having requested the bus access relating to the non-coincidence this time, and, for example, according to the specification of an exceptional processing for the control register 44, performs an error notification to the processor element of the other side of the processor element having already shown the coincidence of the access request relating to the operation corresponding to TMR or to the outside of the multiprocessor system MPS_2 chip made into a single chip (D-47). In order to stop the subsequent bus access of a processor element, for example, a state of pending may be maintained without returning an access completion notification to the access request. Alternatively, a dedicated response cord for specifying the operation stop may be returned.

According to the above-described multiprocessor system MPS_2, the following additional operation effect is obtained for the multiprocessor system MPS_1. That is, in the case of the multiprocessor system MPS_2, even when the coincidence of operation timing by an individual processor element is not guaranteed, and even when the guarantee is not sufficient, the operation corresponding to TMR can be performed without any problem.

<<Multiprocessor System MPS_3>>

Figure 14:
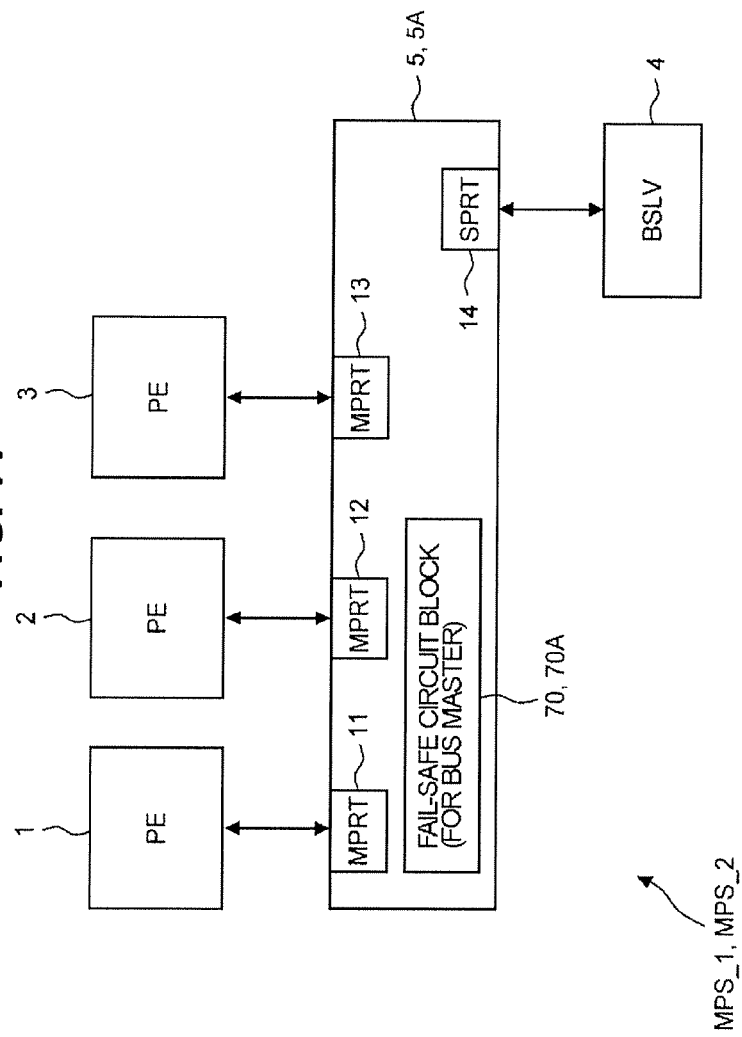
FIG. 14 is a schematic explanatory drawing that aggregates multiprocessor systems explained in FIG. 1 and FIG. 8.
Figure 15:
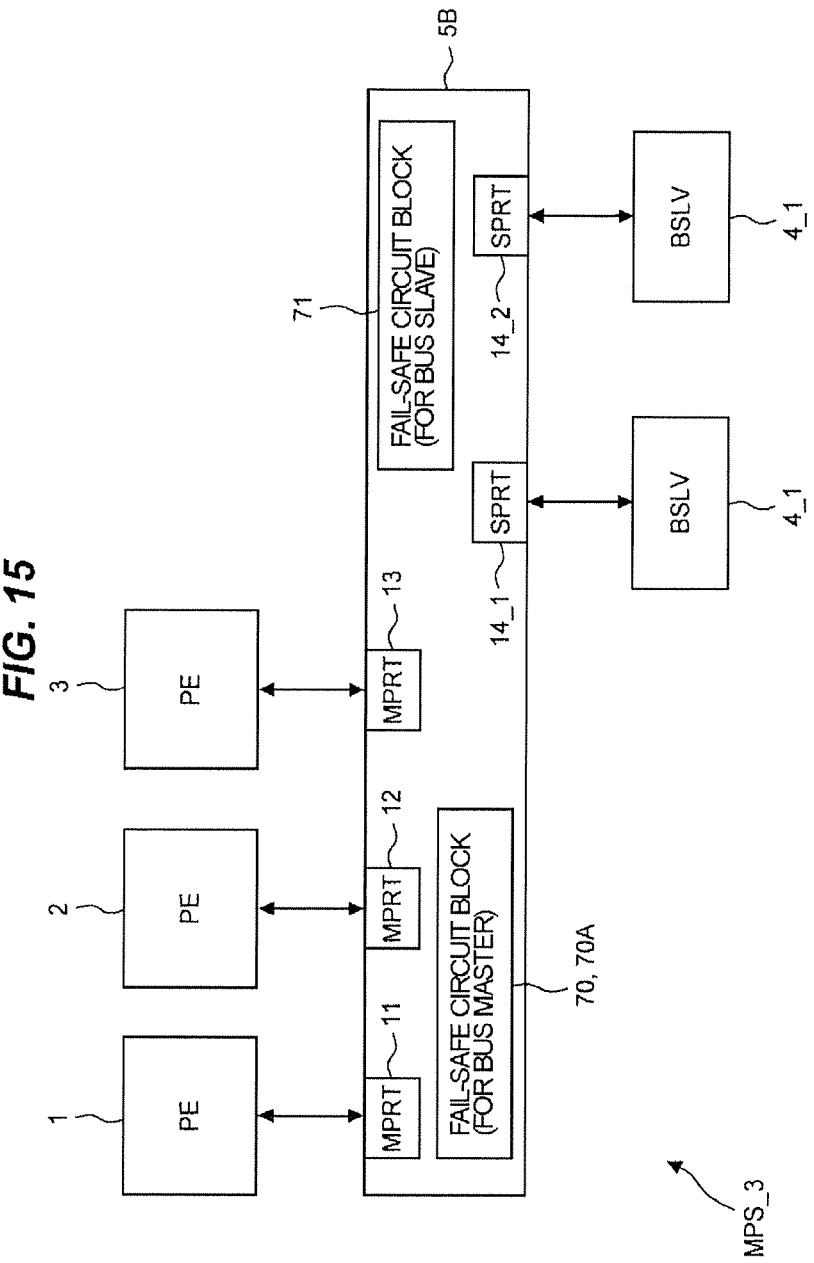
FIG. 15 is a schematic explanatory drawing that shows an application example of expanding a fail-safe function to a bus slave module side.

The multiprocessor systems MPS_1 and MPS_2 explained in FIGS. 1 and 8 realize, as aggregated in FIG. 14, the fail-safe of a plurality of processor elements 1 to 3 by the operation corresponding to DLS or the operation corresponding to TMR using the fail-safe circuit blocks (for bus master) 70 and 70A of the bus interface units 5 and 5A. MPRT means a master port, and SPRT means a slave port. The fail-safe circuit blocks (for bus master) 70 and 70A are, in the case of FIG. 1, constituted of the bus access information storage circuit 40, the bus access information comparator 41, the bus access determination/control circuit 42, the time measurement device 43, the control register 44, and the status flag register 45. In the case of FIG. 8, the fail-safe circuit blocks (for bus master) 70 and 70A are constituted of the bus access information storage circuit 40, the bus access information comparator 41, the bus access determination/control circuit 42A, the time measurement device 43, the control register 44, the status flag register 45, the read data holding queue 60, and the bus access information holding queue 61. In FIG. 15, an application example in which it is expanded to the bus slave module side is shown.

The multiprocessor system MPS_3 exemplified in FIG. 15 has a bus interface unit 5B, which is different in that two slave ports (SPR) 14_1 and 14_2 and a fail-safe circuit block (for bus slave) 71 are added as compared with the bus interface units 5, 5A. The same bus slave modules 4_1 and 4_2 are coupled to the slave ports (SPR) 14_1 and 14_2. The fail-safe circuit block (for bus slave) 71 performs a fail-safe control on the bus slave modules 4_1 and 4_2.

When fail-safe circuit blocks 70 and 70A for a bus master permit bus access responding to the access request of a processor element by the above-described control, the fail-safe circuit block 71 for a bus slave gives the access request to two slave ports 14_1 and 14_2 and causes each of bus slave modules 4_1 and 4_2 to perform the same access operation. The fail-safe circuit block 71 for a bus slave receives the access result from both according to that and determines whether or not these are the same. In the case of a read operation, the block determines that the read data are the same, and in the case of a write operation, the block determines whether or not the end statuses of the write operation are the same. When the statuses are the same, a control for returning the access result to the access request source is performed, and when these show non-coincidence, a determination of either the bus slave module 4_1 or 4_2 being in a failure state is made and module exceptional processing is indicated to the access request source or the like, and furthermore the abnormality of the bus slave modules 4_1 and 4_2 is notified to the other processor element.

Therefore, along with the fail-safe for the processor element, failure detection for the bus slave module can also be performed. Note that the failure detection is not limited to the adoption of the fail-safe circuit block 71, but as long as the failure detection is the adoption of a bus slave module capable of utilizing ECC or parity, duplication thereof is unnecessary.

<<Superiority of Fail-Safe Function in Embodiment>>

Figure 16:
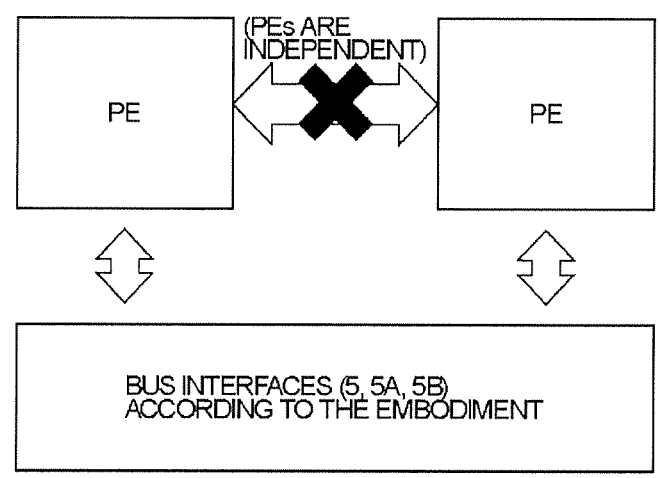
FIG. 16 is an explanatory drawing that shows principally the fail-safe function of the multiprocessor system explained in the embodiment.

FIG. 16 is an explanatory drawing that showing fundamentally the fail-safe function of the multiprocessor system explained in the above-described embodiment. In contrast, in FIG. 17, a conventional fail-safe function is shown fundamentally.

Figure 17:
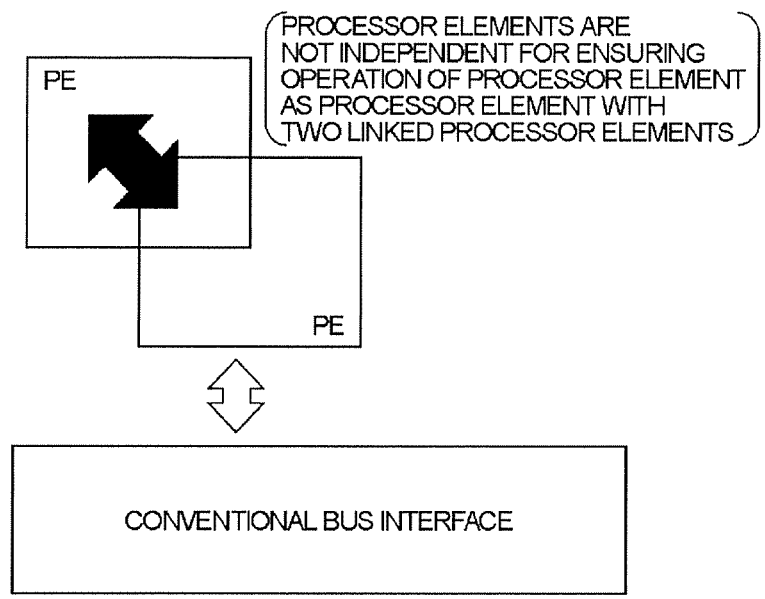
FIG. 17 is an explanatory drawing that shows principally a conventional fail-safe function.

Conventional DLS or TMR has, as exemplified in FIG. 17, a fundamental mechanism in which a plurality of processor elements PEs is tightly coupled and coincidence/non-coincidence of mutual operations is determined by a logic circuit, and in which, when the determination shows coincidence, a bus access is requested for a bus interface BIF. Namely, in order to guarantee the operation of a processor element as one bus master based on two linked processor elements, the processor elements are tightly coupled and are made non-independent.

On the other hand, in the multiprocessor system according the above-described embodiment, coincidence/non-coincidence of operations between processor elements is determined depending on coincidence/non-coincidence for a bus access request, and the control thereof is performed by bus interface units BIUs (5, 5A, and 5B). Accordingly, processor elements may be independent of one another.

The above-described difference brings about the following superiority of the multiprocessor system according to the embodiment. That is, in the conventional technique in FIG. 17, since two processor elements mutually have a relationship, the implementation satisfying both the actualization of high performance and the realization of functional safety in the implementation of two processor elements is considered to be difficult because the processor elements have to be made operable at the highest speed. In the present embodiment, since mutual processor elements are related only via a bus interface unit BIU, there is no restriction on timing between the processor elements of the highest speed, and for example, the speed restriction is alleviated to the point of the operation speed between the bus interface unit BIU and the processor element PE, and the restriction on the implementation from the viewpoint of functional safety is few.

Furthermore, when TMR or DLS have to be realized by being tightly coupled, the mode of fail-safe is fixed, thereby making it difficult to realize a programmable fail-safe function such as realizing a fail-safe function only between required processor elements depending on processing, or performing fail-safe only for a required data processing. In the continuation of high functionalization of semiconductor integrated circuits or the increase in logic scale, a programmable fail-safe function using a control register in such a way has superiority over conventional technology.

As described above, no measure is necessary on the processor element side in point of the functional safety of the system, and the presence or absence of check by the fail-safe function based on the bus master unit and the combination of processor elements to be a check target can be set arbitrarily. Accordingly, the degree of freedom of selection of fail-safe function is large, and implementation cost for configuring a multiprocessor system while implementing a plurality of processor elements can be decreased.

Since individual processor element is independent and the fail-safe function is realized by the bus interface unit, it becomes possible to differentiate operation frequency at the time of implementation of the processor element, and to alleviate the restriction on a disposition region at the time of implementation of individual processor element. A suitable embodiment in the point is the multiprocessor system MPS_2 described in FIG. 8.

Needless to say, the present invention is not limited to the above-described embodiment and can be modified variously in the scope that does not deviate from the purport of thereof.

For example, the number of the processor elements or the number of the bus slave modules is not limited to that in the embodiment, but can be modified appropriately.

In addition, the bus interface control function is not limited to the split-transaction-bus interface function but may be an exclusive bus.

Furthermore, the action when an abnormality occurs is not limited to cancellation or stop of the bus access, but it may be configured such that, when the same bus access by another processor element is absent during a certain time from a bus access request and the processor element is considered as the occurrence of an abnormality, operation stop of the processor element, stop of supply of a synchronizing clock, or shutdown of a power source is performed for the abnormal processor element, and the abnormal processor element is cut off completely from the operation of other processor elements and thus the influence of the abnormal processor element is not exerted on other processor elements.

Moreover, the safety measure processing relating to the access request is not limited to those in the above-described embodiment, but the safety measure processing may be a single or plural processing selected from the cancellation of the access request issued by a processor element that is considered to be abnormal, the instruction of operation stop to a processor element being the issue source of an access request that does not coincide with other access requests, reset processing for a processor element being the issue source of an access request that does not coincide with other access requests, and an error notification to the outside of the multiprocessor system.

What is claimed is:

1. A multiprocessor system comprising:
   a plurality of processors;
   a bus slave circuit accessible by the plurality of processors;

a bus disposed between the plurality of processors and the bus slave circuit; and a fail-safe circuit configured to perform a fail-safe process to maintain functional safety on the multiprocessor system, wherein the plurality of processors includes first, second and third processors which perform a process in lock-step, and wherein the fail-safe circuit configured to:

when a first bus access request issued by the first processor is consistent with a second bus access request issued by the second processor and a third bus access request issued by the third processor within a predetermined period after the first bus access request is issued, execute a bus access request based on the first, second and third bus access requests, when the first bus access request issued by the first processor is consistent with the second bus access request issued by the second processor and is not consistent with the third bus access request issued by the third processor within the predetermined period after the first bus access request is issued, execute a bus access request based on the first and second bus access requests and execute the fail-safe process for the third bus access request, and when the first bus access request issued by the first processor is not consistent with the second bus access request issued by the second processor and the third bus access request issued by the third processor within the predetermined period after the first bus access request is issued, execute the fail-safe process for the first, second and third bus access requests.

2. The multiprocessor system according to claim 1, wherein the fail-safe process is a cancel of the inconsistent bus access request.

3. The multiprocessor system according to claim 1, wherein the fail-safe process is a stop instruction to a processor which issues the inconsistent bus access request.

4. The multiprocessor system according to claim 1, wherein the fails-safe process is a reset instruction to a processor which issues the inconsistent bus access request.

5. The multiprocessor system according to claim 2, wherein the fail-safe process further includes an error notification to an outside of the multiprocessor system.

6. The multiprocessor system according to claim 1, wherein the bus includes the fail-safe circuit.

7. The multiprocessor system according to claim 1, wherein the multiprocessor system comprises a single-chip.

* * * * *